US009043332B2

(12) United States Patent
Noel et al.

(10) Patent No.: US 9,043,332 B2
(45) Date of Patent: *May 26, 2015

(54) CLUSTER PERFORMANCE MONITORING

(71) Applicant: Splunk Inc., San Francisco, CA (US)

(72) Inventors: Cary Glen Noel, Pleasant Hill, CA (US); Kirubakaran Pakkinsamy, San Ramon, CA (US); Alex Raitz, San Francisco, CA (US); Pierre Tsai, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,910

(22) Filed: Oct. 25, 2012

(65) Prior Publication Data

US 2014/0074850 A1    Mar. 13, 2014

Related U.S. Application Data

(63) Continuation of application No. 13/607,192, filed on Sep. 7, 2012.

(51) Int. Cl.
  *G06F 17/30* (2006.01)
  *G06F 11/07* (2006.01)

(52) U.S. Cl.
  CPC ........ *G06F 11/0709* (2013.01); *G06F 11/0751* (2013.01)

(58) Field of Classification Search
  CPC .......................... G06F 11/0709; G06F 11/0751
  USPC .......................................................... 707/741
  See application file for complete search history.

(56) References Cited

U.S. PATENT DOCUMENTS

2012/0137367 A1* 5/2012 Dupont et al. ................. 726/25
2012/0173477 A1* 7/2012 Coutts et al. ................ 707/602
2014/0075327 A1   3/2014 Noel et al.

OTHER PUBLICATIONS

"Apache Hadoop," Wkipedia the Free Encyclopedia, http://en.wikipedia.org/wiki/Apache_Hadoop, pp. 1-12, retrieved Nov. 14, 2012.
Carasso, D., "Exploring Splunk: Search Processing Language (SPL) Primer and Cookbook," Splunk, Apr. 2012.
Official Communication for U.S. Appl. No. 13/607,192 mailed Jan. 10, 2013.
Notice of Allowance of Apr. 29, 2013 for U.S. Appl. No. 13/607,192, 9 pages.

* cited by examiner

*Primary Examiner* — Sheree Brown
(74) *Attorney, Agent, or Firm* — Wong & Rees LLP; Kirk D. Wong

(57) ABSTRACT

Embodiments are directed towards the visualization of machine data received from computing clusters. Embodiments may enable improved analysis of computing cluster performance, error detection, troubleshooting, error prediction, or the like. Individual cluster nodes may generate machine data that includes information and data regarding the operation and status of the cluster node. The machine data is received from each cluster node for indexing by one or more indexing applications. The indexed machine data including the complete data set may be stored in one or more index stores. A visualization application enables a user to select one or more analysis lenses that may be used to generate visualizations of the machine data. The visualization application employs the analysis lens to produce visualizations of the computing cluster machine data.

24 Claims, 19 Drawing Sheets

CLUSTER PERFORMANCE MONITORING

CROSS-REFERENCE TO RELATED APPLICATIONS

The present application is a Continuation of U.S. application Ser. No. 13/607,192 filed Sep. 7, 2012, entitled "VISUALIZATION OF DATA FROM CLUSTERS," the benefit of the earlier filing date of which is hereby claimed under 35 U.S.C. §120 and 37 C.F.R. §1.78, and which is further incorporated by reference.

TECHNICAL FIELD

This invention relates generally to information organization, visualization, and retrieval, and more particularly, to visualizing machine data generated by computing clusters.

BACKGROUND

Cluster based computing continues to become more common as the need for processing large data sets increases. Additionally, computing clusters may be employed to provide the computing resources for popular network and cloud-based applications, such as, search engines, social networks, online media, or the like. For many common applications the number of nodes comprising clusters may increase as the size of the data sets and the number of simultaneous users increase.

In some cases, computing clusters may comprise hundreds of heterogeneous nodes, including, data nodes, various control nodes, load balancers, or the like. Also, computing clusters may be distributed across multiple physical locations. The large number of nodes, node heterogeneity, and node de-centralization contribute to system complexity which may increase the difficulty of monitoring and/or troubleshooting computing clusters.

Receiving log files and other machine data generated by cluster nodes comprising computing clusters may overwhelm standard monitoring and troubleshooting techniques. The machine data generated by cluster nodes comprising computing clusters may result in large unwieldy datasets that are difficult to search, monitor, or review. Furthermore, even if errors and failures are detected using standard practices such as log files, the complexity of computing cluster systems coupled with the large amount of machine data may make the discovery of the causes of failures and subsequent troubleshooting difficult. Thus, it is in the consideration of at least these issues that the following subject matter is directed.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Description Of The Various Embodiments, which is to be read in association with the accompanying drawings, wherein.

DETAILED DESCRIPTION OF THE DRAWINGS

Figure 1:
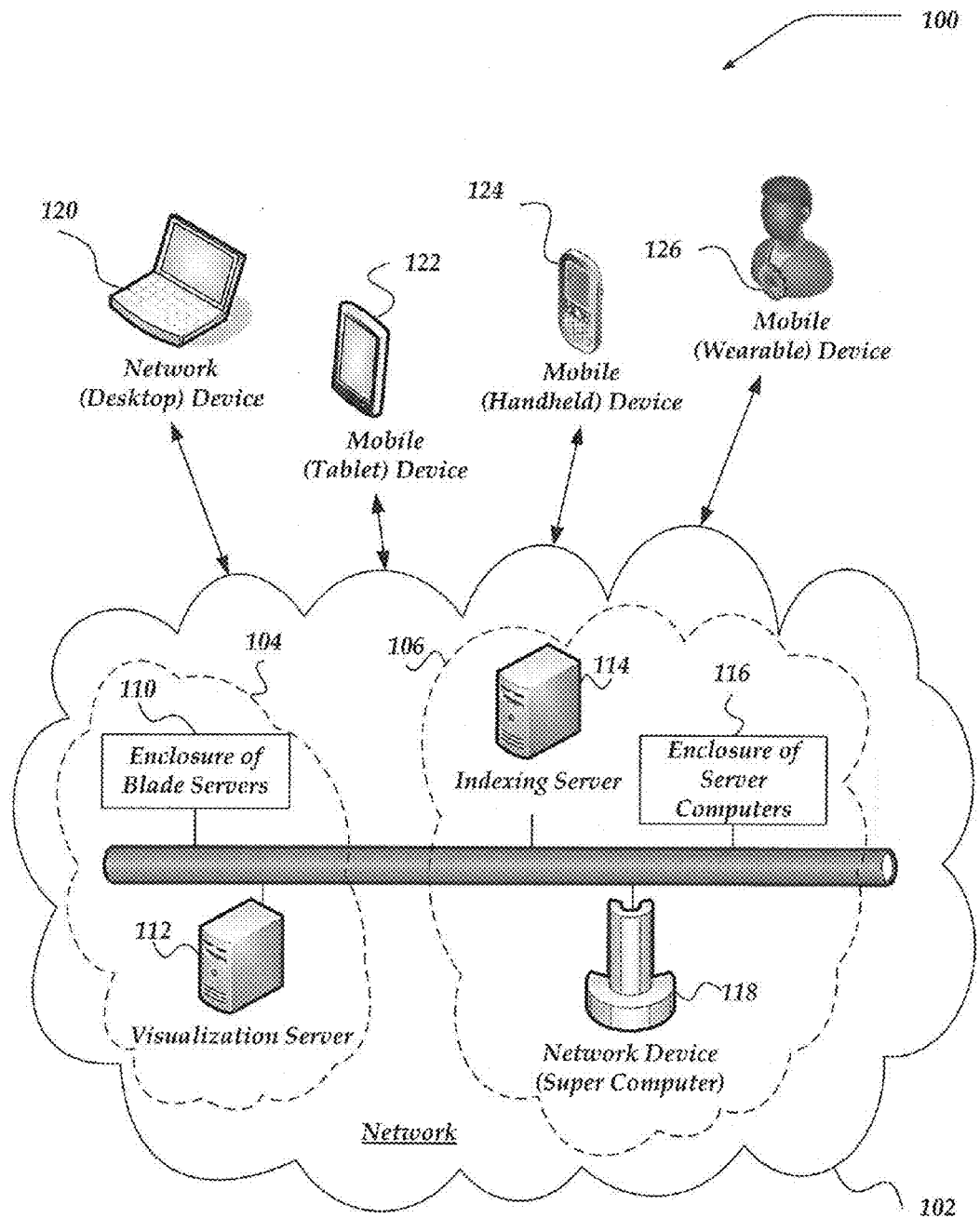
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "machine data" as used herein may include server logs and other types of machine data (i.e., data generated by machines). In at least one of the various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second.

The term "time series data" as used herein is data where each data record has a timestamp associated with it. A "Time Series Search Engine" is a search engine which, in at least one of the various embodiments, can perform queries limited by a time range (such as between one time and another, or data earlier than a given time, or the like) on the stored data and/or generate results ordered by time and/or timestamps (such as from earliest-to-latest or vice versa).

The term "configuration information" as used herein refers to data and/or directives that may be employed by an indexer application or a previewing application for processing, such as indexing, transforming, and/or interpreting machine data. The configuration information may be saved using various storage mechanisms, such as, file systems, databases, computer memory, or the like.

Configuration information may include rules that may be comprised of filters, matching functions, rules for determining "event boundaries" within received machine data (e.g., rules for dividing an event stream into individual lines, rules for merging lines into multi-line events, or the like), rules for locating and parsing timestamps in machine data, or the like. The configuration information may be employed by indexing applications to identify events of interest that may be included in machine-generated data, identify and extract fields within events, or the like.

The term "query string" as used herein refers to commands and/or sequences of commands that are used for querying, searching and/or retrieving data from a data repository (e.g., index stores). Queries generally produce a result or results based on the form and structure of the particular query string. Query results may be sorted and grouped based on the structure and form of the query string. In at least one of the various embodiments, query strings may include commands, operators, functions, or the like for calculating values based on the stored records, including functions that produce result sets that may include statistics and metrics about the data stored in data repository. Structured Query Language (SQL) is a well-known query language often used to form queries for relational databases. However, the various embodiments are not limited to using SQL-like formatting for query strings. Accordingly, other well known query languages and/or custom query languages may be employed consistent with what is claimed herein.

The term "analysis lens" as used herein refers to an abstraction of various factors, such as performance metrics, time windows, visualization types, or the like, that are either chosen by a user and/or determined by the visualization application to analyze machine data. An analysis lens provides at least one point of view into the machine data that may be received from a computing cluster. A user may select one or more predetermined factors for the analysis lens such as CPU (processor), memory, Input/Output rates, storage disk utilization, tasks, and the like for analyzing various parts and/or properties of the collected machine data in real time or machine data replayed over a selected time window. Also, the user may customize the analysis lens with other user-definable factors that are decoupled from the predetermined factors, e.g., locality such as rack awareness for a blade server, time, physical distance (network hops), number of users, application types, data types, network protocols, network connections, mouse over detection, software components, and the like. A customized lens may operate on the collected machine data in real time or machine data replayed over a selected time window. For example, a user may identify excessive CPU utilization with one analysis lens that is based on predetermined factors. And then employ one or more customized analysis lenses that use one or more user-definable (other) factors to determine the root cause of the excessive CPU utilization.

The term "computing cluster" as used herein refers to an arrangement of multiple computers and/or processors that may be organized into cooperative and/or coordinated processing units. Computing clusters are often comprised of separate physical devices connected by networks. However, virtual machine instances resident on the same local device may be logically arranged into a computing cluster. Also, computing clusters may include a combination of physical computing devices and virtual machines (virtualized computing devices).

The logical organization of computing clusters may vary depending on the type of computing cluster. In some cases, computing clusters may be loosely organized (e.g., web servers behind load balancers) where the individual nodes in a computing cluster may cooperate minimally. In other types of clusters, such as Hadoop clusters, nodes may share a common clustering management application where nodes have particular and specific roles designed to cooperatively resolve computing tasks.

The term "cluster node" as used herein refers to an individual node that is a member of a computing cluster. Cluster nodes may be physical devices and/or virtual machines.

The term "cluster node set" as used herein refers to a set of cluster nodes grouped together based on one or more common properties. The common properties used for grouping cluster nodes into cluster node sets may vary depending on the application of the computing cluster. Also, user input may determine the factors used for grouping cluster nodes into cluster node sets. In at least one of the various embodiments, common properties used to group cluster nodes into cluster node sets may include, physical location (e.g., data-center, rack, slot, or the like), operating system type, hardware type, cluster node role, or the like.

The term "heat map" as used herein refers to a visualization technique that comprises color overlays representing values of a given metric that are projected onto a map representing the logical or physical configuration of a computing cluster. The colors projected onto the map usually correspond to graduated values of the represented metrics. Sometimes, the colors in a heat map are configured so that higher values correspond to "hotter" colors (e.g., yellow, orange, red, or the like) and lower values correspond to "cooler" colors (e.g., green, blue, or the like).

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards the visualization of machine data received from computing clusters. Embodiments may enable improved analysis of computing cluster performance, error detection, troubleshooting, error prediction, or the like. In at least one of the various embodiments, individual cluster nodes generate machine data that includes information and data regarding the operation and status of the cluster node. The machine data is received from each cluster node for indexing by one or more indexing applications. The indexed machine data including the complete data set may be stored in one or more index stores.

In at least one of the various embodiments, a visualization application enables a user to select one or more analysis lenses that may be used to generate visualizations of the machine data. In at least one of the various embodiments, the visualization application employs the analysis lens and one or more visualization techniques to produce one or more visualizations of the computing cluster machine data. A user may select one or more predetermined factors for the analysis lens such as CPU (processor), memory, Input/Output rates, storage disk utilization, tasks, and the like for analyzing various parts and/or properties of the collected machine data in real time or machine data replayed over a selected time window. Also, the user may customize the analysis lens with other user-definable factors that are decoupled from the predetermined factors, e.g., locality such as rack awareness for a blade server, time, physical distance (network hops), number of users, application types, data types, network protocols, network connections, mouse over detection, software components, and the like. A customized lens may operate on the collected machine data in real time or machine data replayed over a selected time window. For example, a user may identify excessive CPU utilization with one analysis lens that is based on predetermined factors. And then employ one or more customized analysis lenses that use one or more user-definable (other) factors to determine the root cause of the excessive CPU utilization.

In at least one of the various embodiments, the visualization application may generate visualizations of computing cluster metrics based on machine data received real-time (or near real-time). Also, the visualization application may generate replayed visualizations of computing cluster metrics based on previously received machine data. In at least one of the various embodiments, the visualization application may enable users to replay previously received machine data that can be used to generate visualizations based on the analysis lens. The previously received machine data may be replayed using one or more analysis lenses enabling a user to generate one or more visualizations of machine data received from the computing cluster.

In at least one of the various embodiments, the visualization application may generate a cluster view that displays one or more representations of the logical and/or physical layout of the cluster nodes comprising a computing cluster. In at least one of the various embodiments, the visualization application may generate and overlay symbols and icons that represent events reported by the cluster nodes, the roles performed by the cluster node, cluster node up/down status, or the like.

In at least one of the various embodiments, heat map visualizations may be generated based on one or more metrics included in the received machine data. Users may interactively change the metric that may be represented by the heat map colors. For example, a heat map may first be generated based on CPU utilization and then later a user may change the mapped metric to Memory utilization. Changing the heat map metric within the same view may enable users to observe otherwise difficult to discern relationships and correlations regarding the performance of cluster nodes in a computing cluster.

In at least one of the various embodiments, the visualization application may combine multiple visualizations into a single overlay view. For example, events, cluster node roles, and heat map information may be combined into a single visualization element.

Furthermore, in at least one of the various embodiments, users may save one or more visualizations and associate them with alerts that may correspond to observed errors and event patterns. For example, if a heat map pattern is found to be associated with a particular type of error condition, such as a hardware rack failure, a user may save the heat map pattern and associate it with a rack failure alert. This may enable the event pattern may be recognized in the future. In some cases, the visualization application may detect that a critical event pattern is developing before a termination failure is reached.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include visualization server device 112, indexing server device 114, enclosure of blade servers 110, enclosure of server computers 116, super computer network device 118, or the like. Although not shown, one or more mobile devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet mobile device 122, handheld mobile device 124, wearable mobile device 126, desktop network device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a mobile device is described in more detail below in conjunction with FIG. 3. Generally, mobile devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSIs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
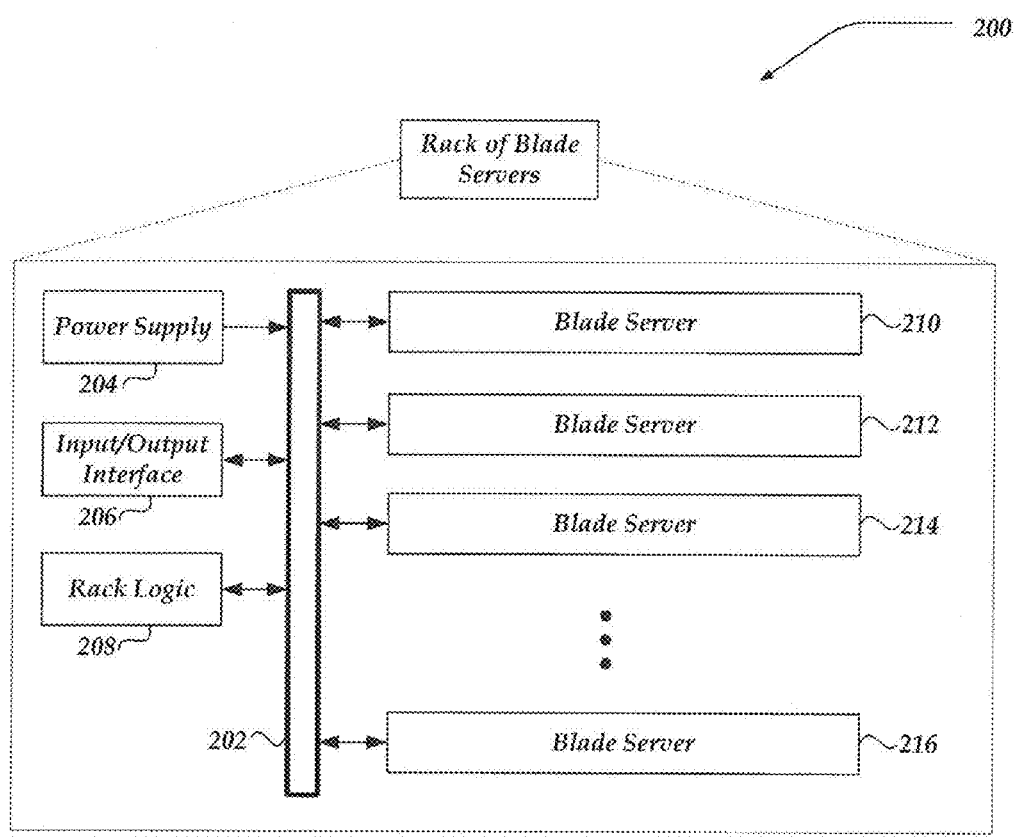
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
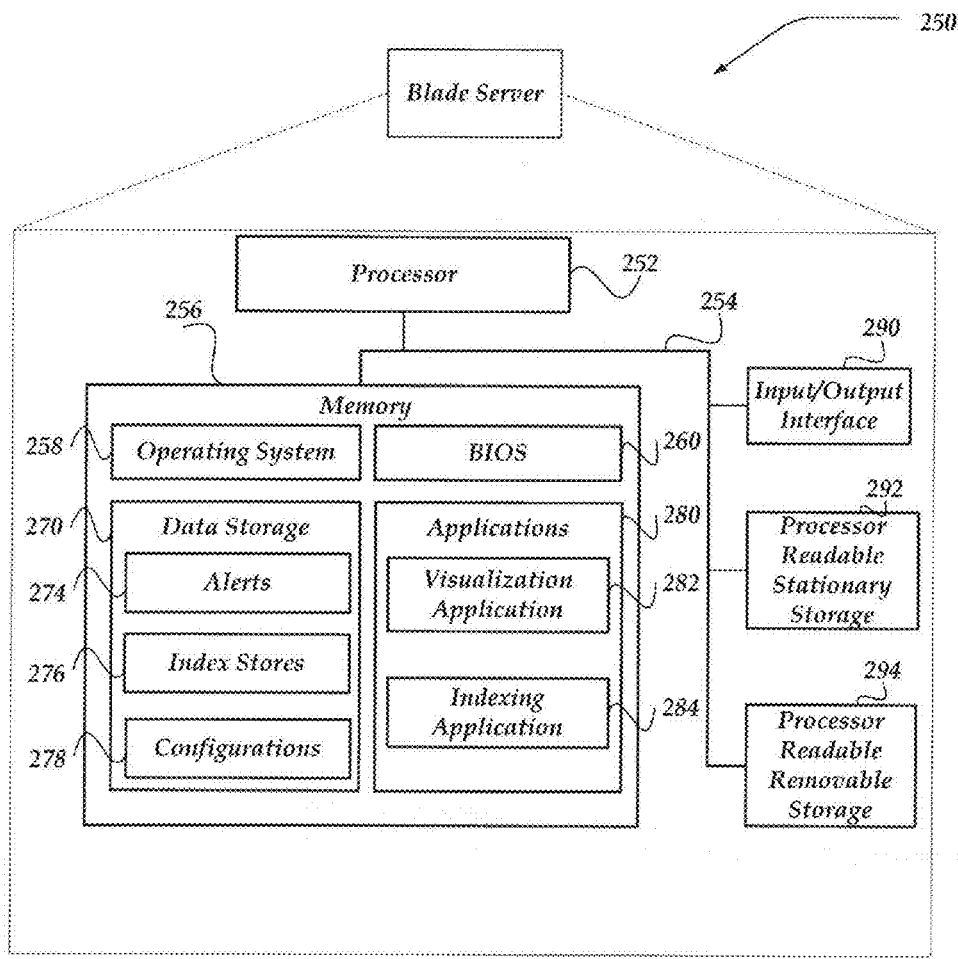
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™ and Apple Computer's IoS Server™, or the like.

Memory 256 further includes one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, alerts 274, index stores 276, or configurations 278.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example visualization application 282, and indexing application 284.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Mobile Device

Figure 3:
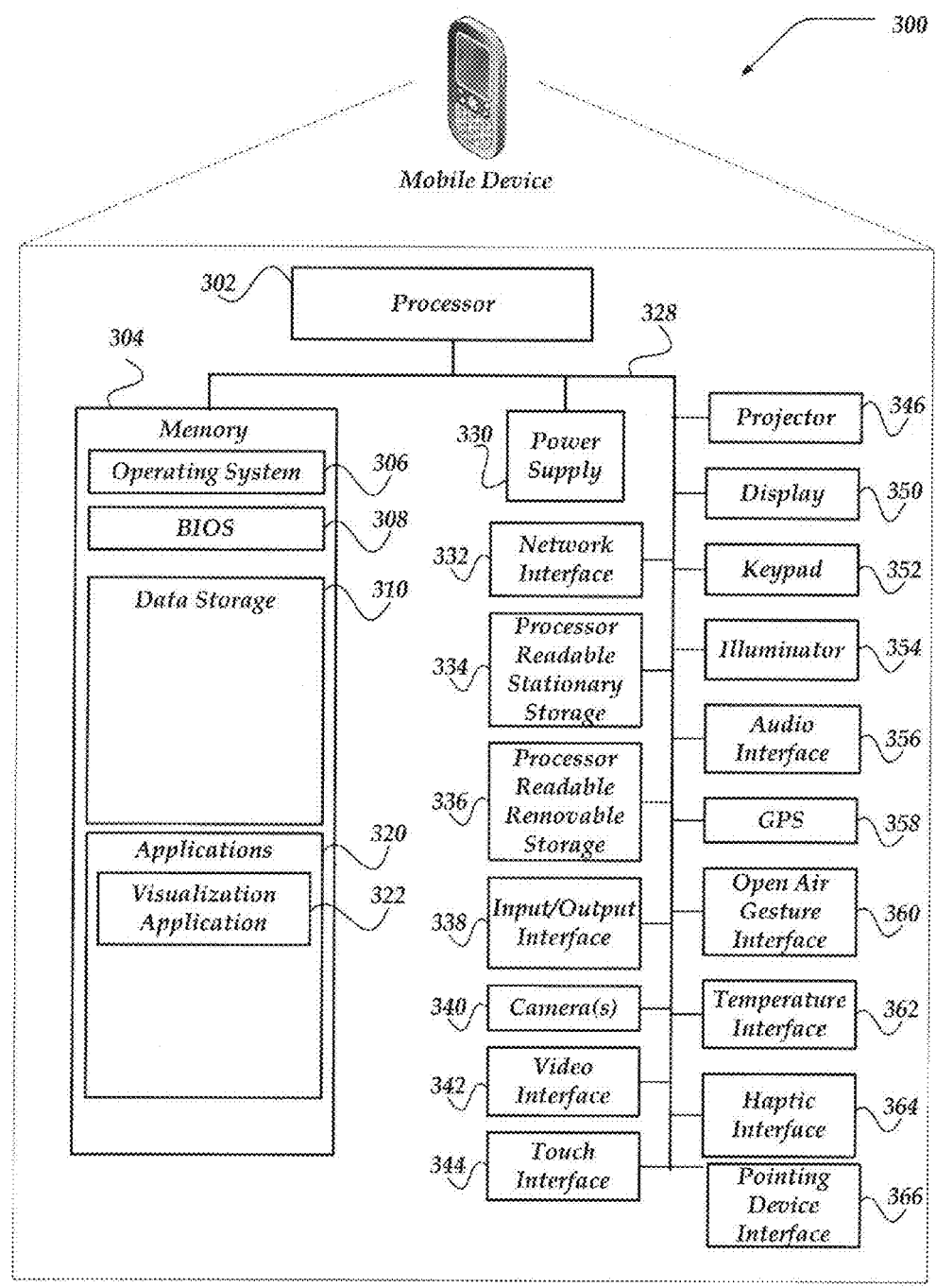
FIG. 3 shows a schematic embodiment of a mobile device.

FIG. 3 shows one embodiment of mobile device 300 that may include many more or less components than those shown. Mobile device 300 may represent, for example, at least one embodiment of mobile devices shown in FIG. 1.

Mobile device 300 includes processor 302 in communication with memory 304 via bus 328. Mobile device 300 also includes power supply 330, network interface 332, audio interface 356, display 350, keypad 352, illuminator 354, video interface 342, input/output interface 338, haptic interface 364, global positioning systems (GPS) receiver 358, Open air gesture interface 360, temperature interface 362, camera(s) 340, projector 346, pointing device interface 366, processor-readable stationary storage device 334, and processor-readable removable storage device 336. Power supply 330 provides power to mobile device 300. A rechargeable or non-rechargeable battery may be used to provide power. The power may also be provided by an external power source, such as an AC adapter or a powered docking cradle that supplements and/or recharges the battery. And in one embodiment, although not shown, a gyroscope may be employed within mobile device 300 to measuring and/or maintaining an orientation of mobile device 300.

Mobile device 300 may optionally communicate with a base station (not shown), or directly with another computing device. Network interface 332 includes circuitry for coupling mobile device 300 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), Web Access Protocol (WAP), ultra wide band (UWB), IEEE 802.16 Worldwide Interoperability for Microwave Access (WiMax), Session Initiation Protocol/Real-time Transport Protocol (SIP/RTP), General Packet Radio Services (GPRS), Enhanced Data GSM Environment (EDGE), Wideband Code Division Multiple Access (WCDMA), Long Term Evolution Advanced (LTE), Universal Mobile Telecommunications System (UMTS), Orthogonal frequency-division multiplexing (OFDM), Code Division Multiple Access 2000 (CDMA2000), Evolution-Data Optimized (EV-DO), High-Speed Downlink Packet Access (HSDPA), or any of a variety of other wireless communication protocols. Network interface 332 is sometimes known as a transceiver, transceiving device, or network interface card (NIC).

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures. Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images. Illuminator 354 may provide a status indication and/or provide light. Illuminator 354 may remain active for specific periods of time or in response to events. For example, when illuminator 354 is active, it may backlight the buttons on keypad 352 and stay on while the mobile device is powered. Also, illuminator 354 may backlight these buttons in various patterns when particular actions are performed, such as dialing another mobile device. Illuminator 354 may also cause light sources positioned within a transparent or translucent case of the mobile device to illuminate in response to actions.

Mobile device 300 also comprises input/output interface 338 for communicating with external peripheral devices or other computing devices such as other mobile devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like. Haptic interface 364 is arranged to provide tactile feedback to a user of the mobile device. For example, the haptic interface 364 may be employed to vibrate mobile device 300 in a particular way when another user of a computing device is calling. Temperature interface 362 may be used to provide a temperature measurement input and/or a temperature changing output to a user of mobile device 300. Open air gesture interface 360 may sense physical gestures of a user of mobile device 300, for example, by using single or stereo video cameras, radar, a gyroscopic sensor inside a device held or worn by the user, or the like. Camera 340 may be used to track physical eye movements of a user of mobile device 300.

GPS transceiver 358 can determine the physical coordinates of mobile device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 300 on the surface of the Earth. It is understood that under different conditions, GPS transceiver 358 can determine a physical location for mobile device 300. In at least one embodiment, however, mobile device 300 may, through other components, provide other information that may be employed to determine a physical location of the device, including for example, a Media Access Control (MAC) address, IP address, and the like.

Human interface components can be peripheral devices that are physically separate from mobile device 300, allowing for remote input and/or output to mobile device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile device with such peripheral human interface components is a wearable computing device, which might include a remote pico projector along with one or more cameras that remotely communicate with a separately located mobile device to sense a user's gestures toward portions of an image projected by the pico projector onto a reflected surface such as a wall or the user's hand.

A mobile device may include a browser application that is configured to receive and to send web pages, web-based messages, graphics, text, multimedia, and the like. The mobile device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of mobile device 300. The memory also stores an operating system 306 for controlling the operation of mobile device 300. It will be appreciated that this component may include a general-purpose operating system such as a version of UNIX, or LINUX™, or a specialized mobile computer communication operating system such as Windows Mobile™, or the Symbian® operating system. The operating system may include, or interface with a Java virtual machine module that enables control of hardware components and/or operating system operations via Java application programs.

Memory 304 further includes one or more data storage 310, which can be utilized by mobile device 300 to store, among other things, applications 320 and/or other data. For example, data storage 310 may also be employed to store information that describes various capabilities of mobile device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile device 300, including, but not limited to, non-transitory processor-readable removable storage device 336, processor-readable stationary storage device 334, or even external to the mobile device. Data storage 310 may include, for example, preview data 314.

Applications 320 may include computer executable instructions which, when executed by mobile device 300, transmit, receive, and/or otherwise process instructions and data.

Applications 320 may include, for example, visualization application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
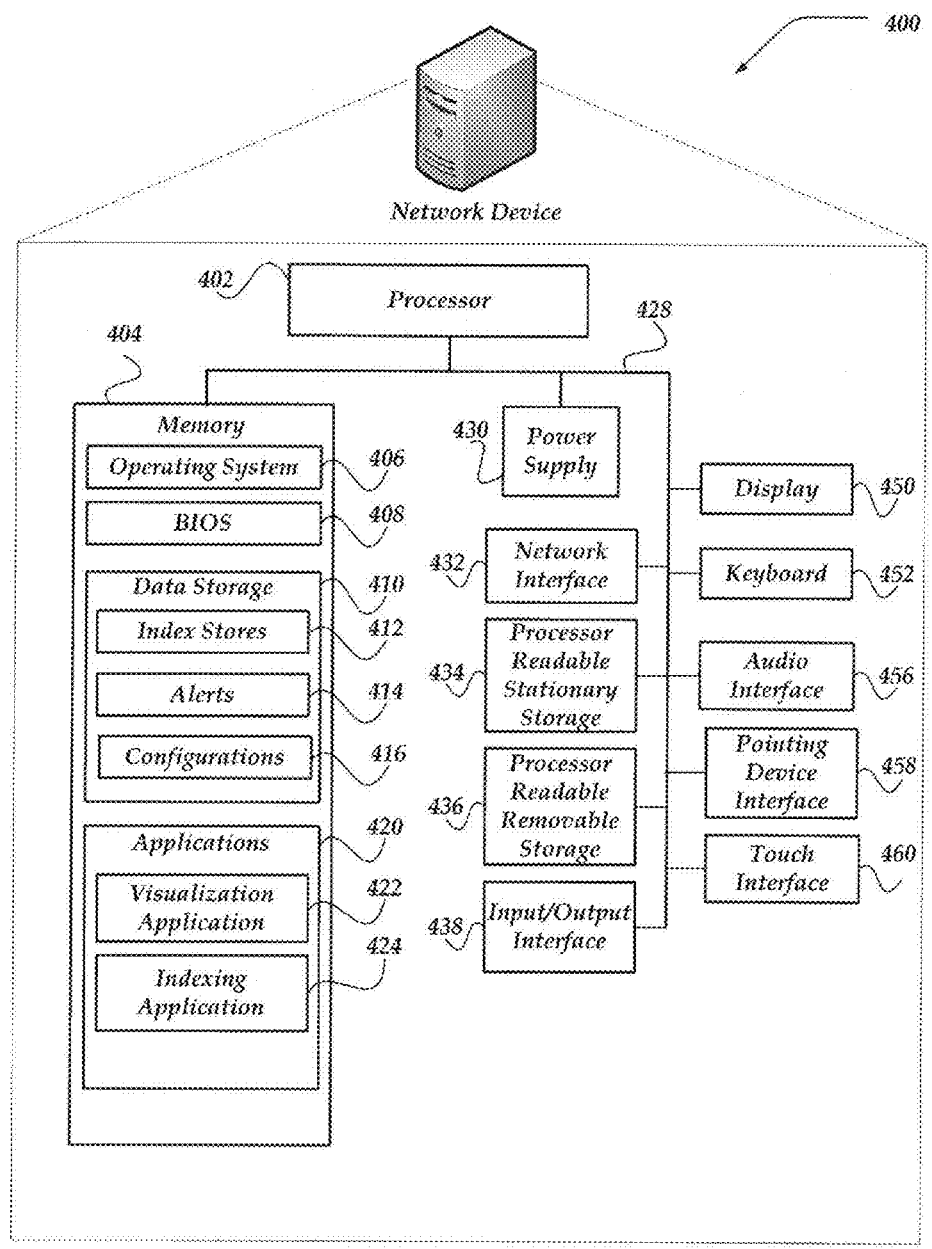
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of previewing server device 112, indexing server device 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows, operating system, or the Apple Corporation's IOs® operating system. The operating system may include, or interface with a Java virtual machine module that enables control of hardware components and/or operating system operations via Java application programs.

Memory 404 further includes one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, index stores 412, alerts 414, configurations 416, or the like.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, visualization application 422, indexing application 424, or the like.

Illustrative Architecture for Visualizing of Data from Clusters

Figure 5:
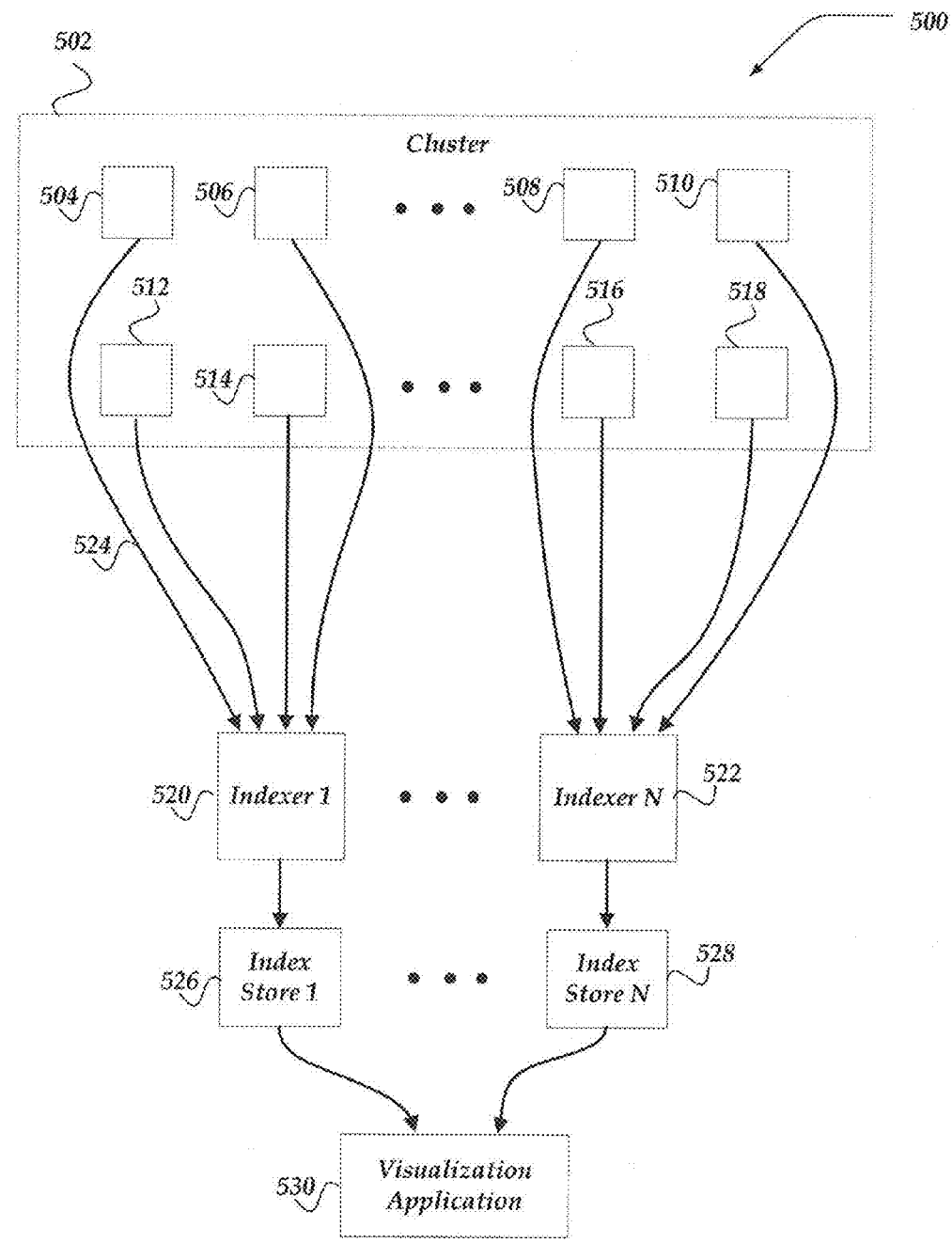
FIG. 5 shows an illustrative logical architecture of a computing cluster with a visualization application in accordance with at least one of the various embodiments.

FIG. 5 shows an illustrative logical architecture of computing cluster system 500 with a visualization application in accordance with at least one of the various embodiments. In at least one of the various embodiments, computing cluster system 500 may comprise computing cluster 502. Further, computing cluster 502 may comprise a plurality of nodes such as cluster nodes 504-518. In at least one of the various embodiments, each cluster node may be arranged to perform a particular role with computing cluster 502, such as, compute nodes, data nodes, control nodes, load balancing nodes, backup nodes (warm/hot spares), or the like.

In at least one of the various embodiments, also some computing clusters may host cluster applications, such as Hadoop, where cluster nodes may have defined roles, such as, Job Tracker, NameNode, Secondary NameNode, Worker Node, Data Node, Task Tracker, or the like.

In at least one of the various embodiments, indexers 520-522 may be arranged to receive machine data generated by the cluster nodes. In some cases, cluster nodes 504-518 may each individually generate machine data that may be received by the indexers. The machine data may be sent over network path such as, network path 524. In some cases, the machine data indexed by indexers 520-522 may include operational and/or diagnostic telemetry that may include metrics, such as, CPU utilization, memory utilization, network traffic, network connections, or the like. In at least one of the various embodiments, indexers 520-522 may be embodiments and/or instances of indexing application 424 residing on network device 400. Likewise, indexers 520-524 may be embodiments and/or instances of indexing application 284 residing on blade server 250.

In at least one of the various embodiments, machine data may be generated by system logging programs such as, syslogd, event loggers, or the like. Also, machine data may be generated by purpose built local agents that may be resident (local) to each cluster node. In at least one of the various embodiments, purpose built agents may generate machine data that includes metrics associated with one or more particular clustering applications, such as Hadoop.

In at least one of the various embodiments, as the received machine data may be processed by the indexers it may be stored in one or more index stores, such as index stores 526-528. The complete record of the source machine data may be retained in index stores 526-528 as well as an index corresponding to the received machine data. Index stores 526-528 may be embodiments and/or instances of index stores 412 stored on network device 400. Likewise, index stores 526-528 may be embodiments and/or instances of index stores 276 stored on blade server 250.

In at least one of the various embodiments, visualization application 530 may employ the indexes and/or machine data stored in index stores 526-528 to generate visualizations that may be employed to monitor, manage, or troubleshoot the computing clusters based on the machine data generated by cluster nodes 504-518. In at least one of the various embodiments, visualization application 530 may be an embodiment and/or instance of visualization application 422 residing on network device 400. Likewise, visualization application 530 may be an embodiment and/or instance of visualization application 282 residing on blade server 250.

In at least one of the various embodiments, machine data generate by computing cluster may include time series data. Further, in at least one of the various embodiments, the indexers (e.g., indexing applications), index stores, and/or the visualization application may comprise modules, components, and/or portions of a time series search engine.

One of ordinary skill in the art will appreciate that computing cluster system 500 is a non-limiting illustration of generic computing cluster. It is presented herein to provide a general illustrative context to facilitate the further description and teaching of at least one of the various embodiments. Other computing cluster arrangements and/or configurations may be used by at least one of the various embodiments.

Figure 6:
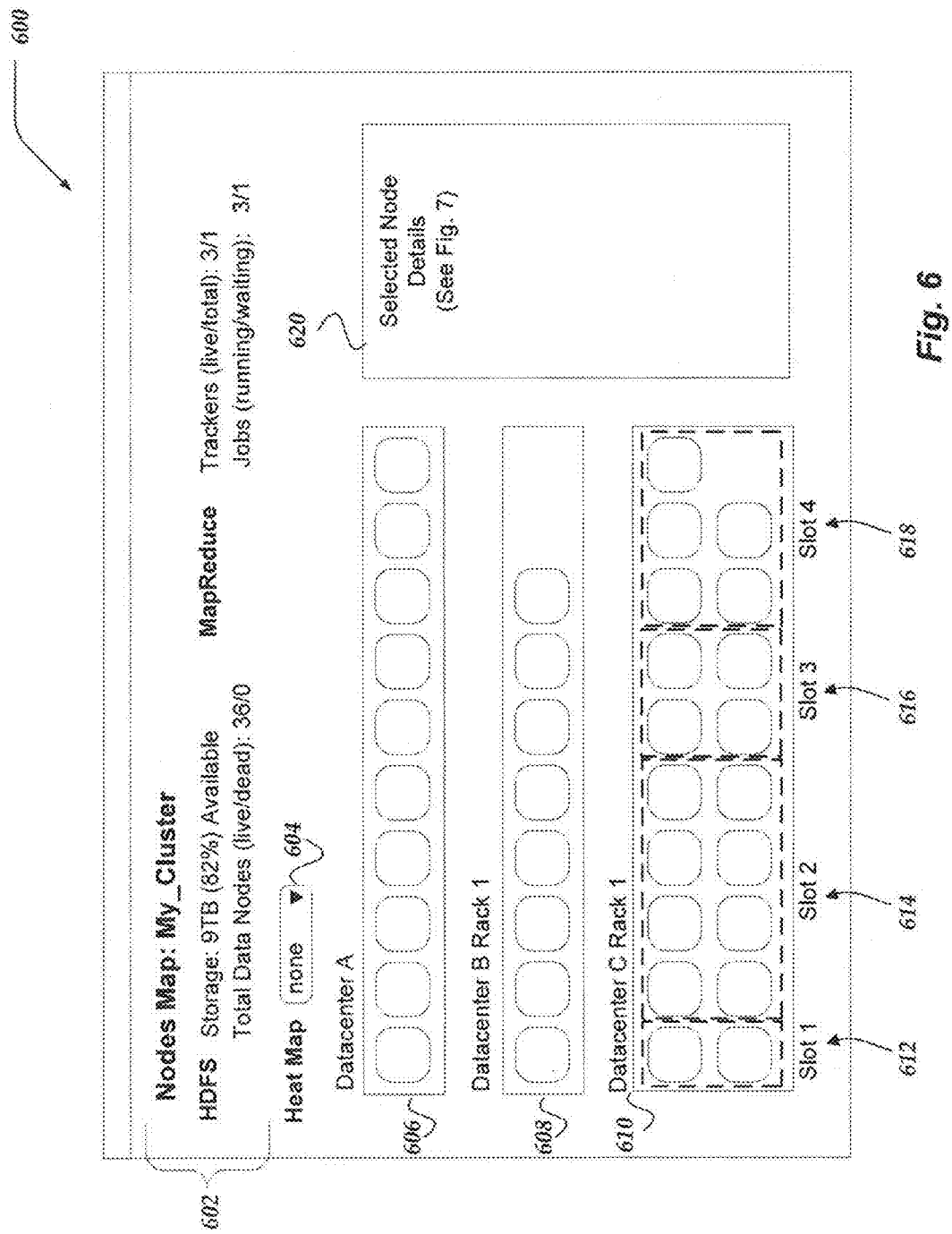
FIG. 6 shows an illustrative user-interface for viewing cluster nodes and other metrics that may be associated with a computing cluster in accordance with at least one of the various embodiments.

FIG. 6 shows illustrative user-interface 600 for viewing the cluster nodes and other metrics that may be associated with a computing cluster in accordance with at least one of the various embodiments.

In at least one of the various embodiments, header section 602 may show system metrics and status information associated with a computing cluster. For example, in at least one of the various embodiments, header section 602 includes metrics relating to file system storage such as total and available storage, and the number of operating data nodes. Further, header section 602 may include application specific information. For example, in at least one of the various embodiments, Map-Reduce metrics such as, Job Trackers and active jobs may be relevant if the computing cluster is a Hadoop cluster. In at least one of the various embodiments, users may generally configure the particular metrics that are displayed and the granularity of the metrics displayed in the header section based on their particular needs. In at least one of the various embodiments, the metrics displayed in the header section may include values generated from the indexes and machine data stored in one or more index stores, such as, index stores 412 or index stores 276.

In at least one of the various embodiments, pick list control 604 may enable users to quickly selected different visualizations of the machine data associated with the computing cluster. In this illustrative embodiment, pick list control 604 may enable a user to activate one or more heat map visualizations for one or more metrics associated with the computing cluster. In at least one of the various embodiments, additional controls that drive additional visualizations may be presented in at least one of the various embodiments.

In at least one of the various embodiments, cluster node sets 606-610 visually represent cluster nodes grouped together based on at least one common factor. In some cases, the cluster nodes may be grouped based on the physical location of the cluster node. For example, cluster node set 606 may represent a set of cluster nodes that are known to be in a particular data-center (e.g., Data Center A). Likewise, cluster node set 608 may be known to comprise physical network devices that reside on a particular hardware rack in a data center (e.g., Data Center B Rack 1).

Further, in at least one of the various embodiments, the particular location and/or arrangement of cluster nodes may be known within a particular hardware rack or rack-row within a data center (e.g., rack-awareness). For example, in at least one of the various embodiments, slot 612 (slot 1) may include two cluster nodes, slot 614 (slot 2) may include eight cluster nodes, slot 616 (slot 3) may include four cluster nodes, and slot 618 (slot 4) may include 5 cluster nodes.

In at least one the various embodiments, a cluster node set visualization may illustrate empty space in a rack or data center. For example, slot 618 is illustrated to show that there may be space available for at least one more cluster node.

Also, in at least one of the various embodiments, user interface 600 may be arranged such that if a user selects a cluster node, detailed metrics associated with the select cluster node may be immediately displayed in detail viewing area 620. This area of the user interface may be employed to provide a user with immediate feedback regarding the operational health and overall performance of the selected cluster node.

In the illustrative system shown in FIG. 6, the common factor employed for grouping the cluster nodes into cluster node sets is physical locations. It should be understood that other common factors may be employed to group the cluster node. In at least one of the various embodiments, common factors may include, the role performed by the network device (e.g., servers, spares, controllers, worker node, or the like), the type of network device based on hardware class, or manufacturer, the type of operating system running on the network device, or the like.

Furthermore, in at least one of the various embodiments, the cluster node visualizations in a user-interface may represent virtual machine instances operating under the supervision of one or more hypervisors. Thus, in at least one of the various embodiments, cluster node sets may be collections of virtual machine instances resident on the same physical network device.

In at least one of the various embodiments, the basis for organizing nodes into cluster node sets may be defined by a user and may be based on the type and granularity of the machine data provided by the cluster nodes. For example, if the cluster nodes are reporting their physical location (e.g., if the cluster nodes demonstrate rack awareness) then this information may be employed to generate cluster node sets. Likewise, if the cluster node reports the type of operating system then the cluster node set may be based around the operating system commonalities of the cluster nodes.

Figure 7:
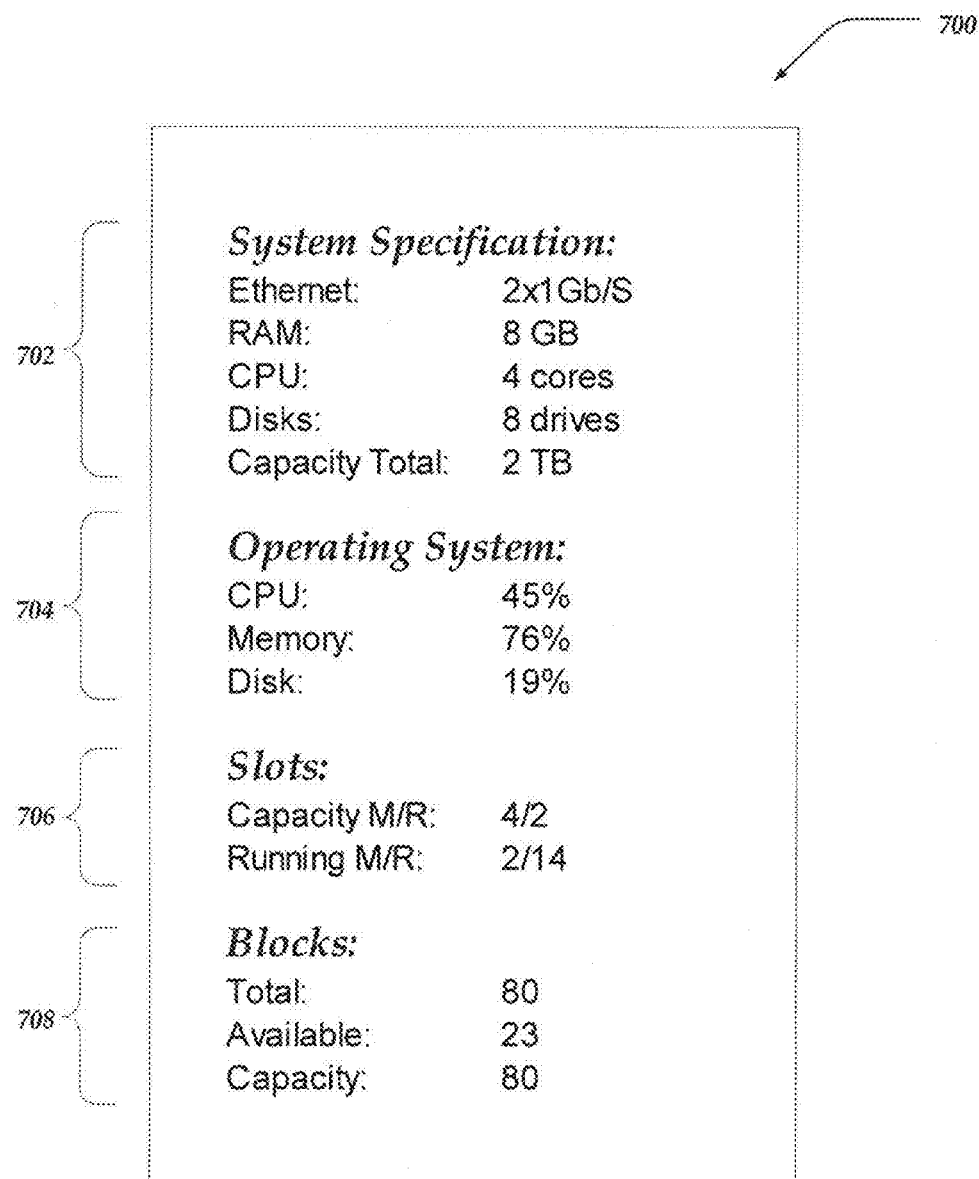
FIG. 7 illustrates a cluster node detail view shows an example of the detail information that may be displayed if a user selects a cluster node in accordance with at least one of the various embodiments.

FIG. 7 illustrates cluster node detail view 700 that shows an example of the detail information that may be displayed if a user selects a cluster node in accordance with at least one of the various embodiments. In at least one of the various embodiments, the information in a cluster node detail view may be arranged in sections, such as, system specification 702, operating system 704, slots 706, blocks 708, or the like. The particular information displayed in a detail view may vary depending on the type cluster node selected and/or the role performed by the cluster node.

Furthermore, in at least one of the various embodiments, users may define the particular metrics and groupings that may be displayed in the cluster node detail view. In at least one of the various embodiments, users may define roll-ups and/or aggregates of one or more metrics included in the machine data that may be generated by the cluster nodes.

Figure 8:
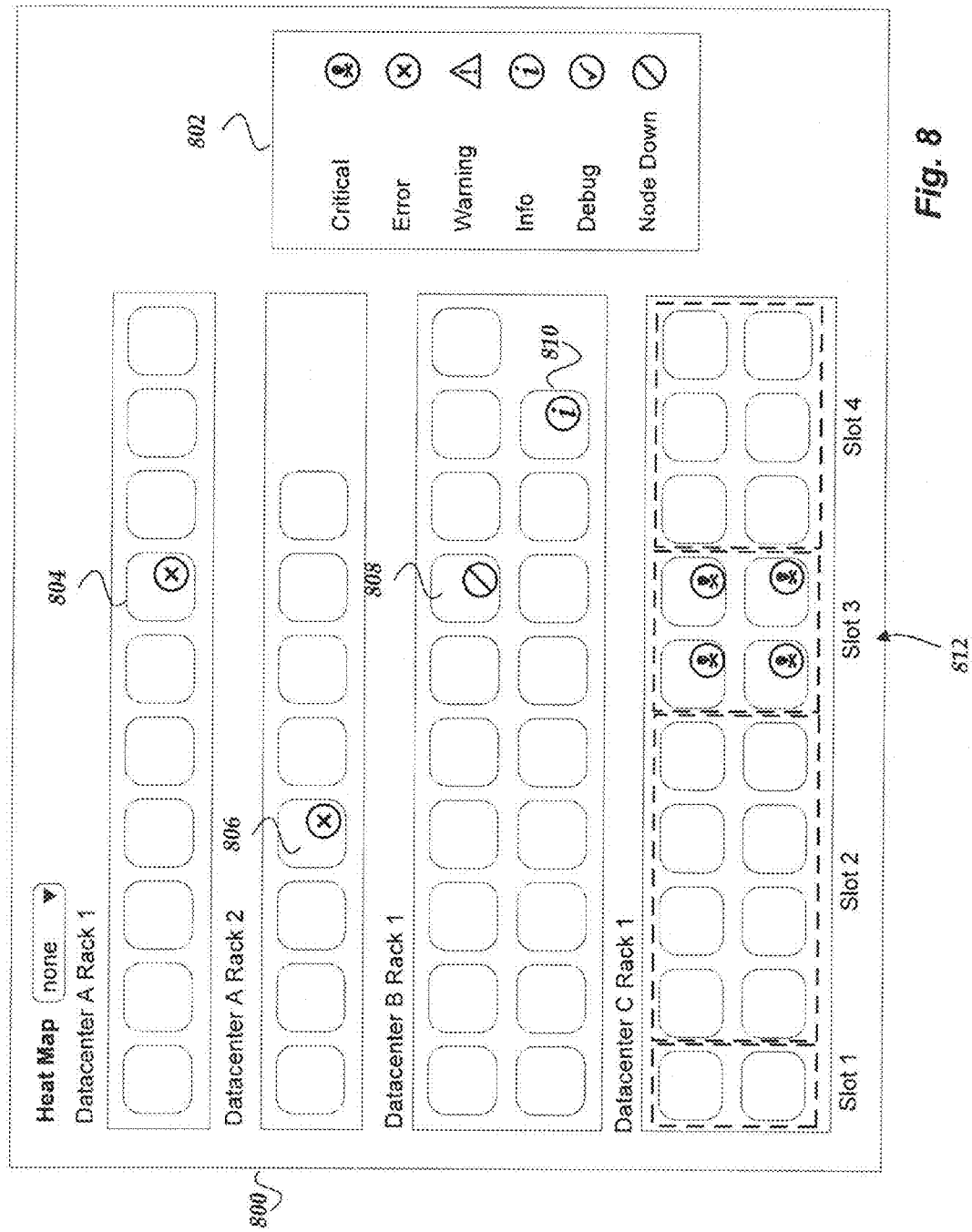
FIG. 8 illustrates a user-interface portion generated by the visualization application that may enable a user to view cluster nodes and associated events in accordance with at least one of the various embodiments.

FIG. 8 illustrates user-interface portion 800 generated by the visualization application that may enable a user to view cluster nodes and associated events in accordance with at least one of the various embodiments. A portion of the user-interface is shown to provide clarity for the associated description and in at least one of the various embodiments it may be a portion of a user-interface such as the one illustrated in FIG. 6.

In at least one of the various embodiments, indexing applications may be configured to identify events from the machine data that may be generated by one or more cluster nodes. These events may be classified into severity levels, such as, Critical, Error, Warning, Info (e.g. information), Debug, or the like.

At least one of the various embodiments of the user-interface may enable an at-a-glance understanding of the state of the computing cluster by rendering symbols that identify one or more events that may have been generated by a cluster node.

In at least one of the various embodiments, legend 802 illustrates a non-limiting example of a set of severity levels with their corresponding user-interface symbols. In this example, an additional symbol that may indicate a "node down" condition is included in the legend. One of ordinary skill in the art will appreciate that other severity levels for events may be employed. Also, in at least one of the various embodiments, additional event-related symbols and labels may be used depending on the application. Further, in at least one of the various embodiments, users may be enabled to configure the severity levels and/or event names. This configuration may include enabling the user to select the user-interface symbols that may correspond to the events and/or severity levels.

In at least one of the various embodiments, user-interface 600 may show individual cluster nodes with an overlaid graphical symbol that may represent one or more events that may have been recorded and/or detected. For example, in at least one of the various embodiments, cluster node 804 may be a cluster node that has generated machine data associated with one or more events that may have a severity level of Error. Likewise, cluster node 806, located in a different rack may have generated Error events as well. Cluster node 808 includes a symbols indicating that the node is down (e.g., not responding, or in the process of recovering from a previous error). And, cluster node 810 has indicates that it has generated one or more Information events. Additionally, in at least one of the various embodiments, the visualization application may generate a visualization that indicates that the four cluster nodes in slot 812 have generated Critical events.

In at least one of the various embodiments, if a user selects a cluster node using a mouse or similar user-input mechanism, the detail view for the cluster node may show additional details that may be associated with the event symbols that are overlaid on the cluster node visualization. Also, in at least one of the various embodiments, event details may be displayed if the user uses a use-input device to "hover" over a cluster node. In such cases, a tooltip-style user-interface element may be generated by the visualization application providing additional information to the user.

In at least one of the various embodiments, the event symbol overlaid on the cluster node may indicate a particular event rather than a class of events. For example, in at least one of the various embodiments, the symbol shown on cluster node 808 may indicate a particular event (node-down) rather than a class of events.

In at least one of the various embodiments, if more than one important event has been generated by a cluster node, the highest priority event may be shown 'on-top' with an additional indication that multiple events may have occurred. In at least one of the various embodiments, the priority levels of events may be configured by the user and/or set by default.

Figure 9:
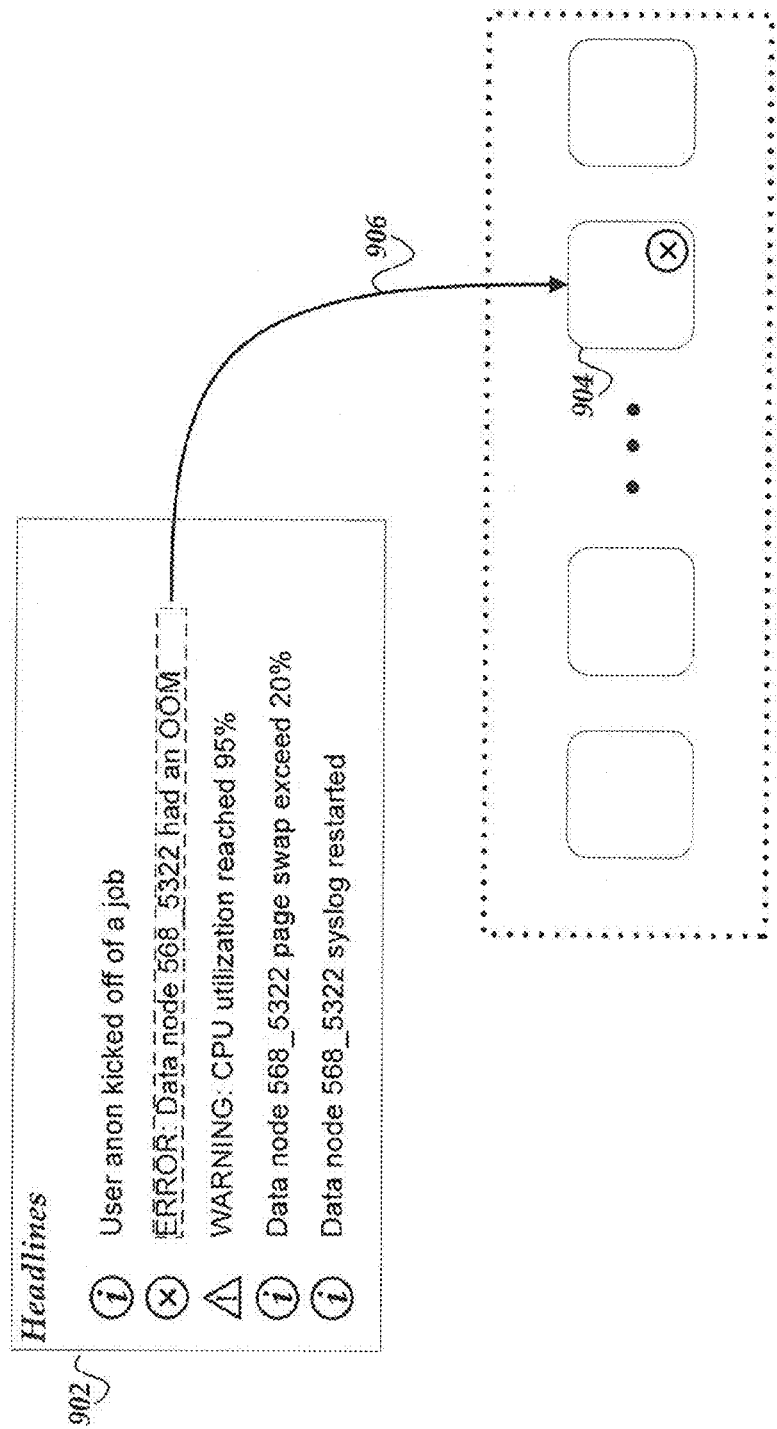
FIG. 9 illustrates how the visualization application may enable events to be visualized and/or accessed using a headline window in accordance with at least one of the various embodiments.

FIG. 9 illustrates how the visualization application may enable events to be visualized and/or accessed using headline window 902 in accordance with at least one of the various embodiments. In at least one of the various embodiments, headline window 902 may be an user-interface element that lists a streaming ticker of events that may be generated by the cluster nodes. Furthermore, in at least one of the various embodiments, one or more entries in the headline window 902 may represent single events that may be based on the machine data received and indexed by the indexing applications. Also, in some embodiments, a record in the headline window may represent an aggregation of several events that have been received. In at least one of the various embodiments, users may determine, by way of configuration, the specific events that may be collected and/or reported in the headline window. Also, in at least one of the various embodiments, users may determine the details and/or aggregation levels of the events displayed in the headline window.

In at least one of the various embodiments, the headline records shown in headline window 902 may be linked to the cluster node set and/or cluster nodes that correspond to the headline record. For example, headline record may be associated using link 906 to cluster node 904. Thus, if a user clicks on a headline record the cluster node view associated with the events represented by the headline may be displayed to the user. One of ordinary skill in the art will appreciate that various well-known techniques may be employ to enable link 906 to associate the headline records to their corresponding cluster nodes/cluster node sets, including, HTML hyperlinks, reference tables, pointers, lookup tables, or the like.

Figure 10A:
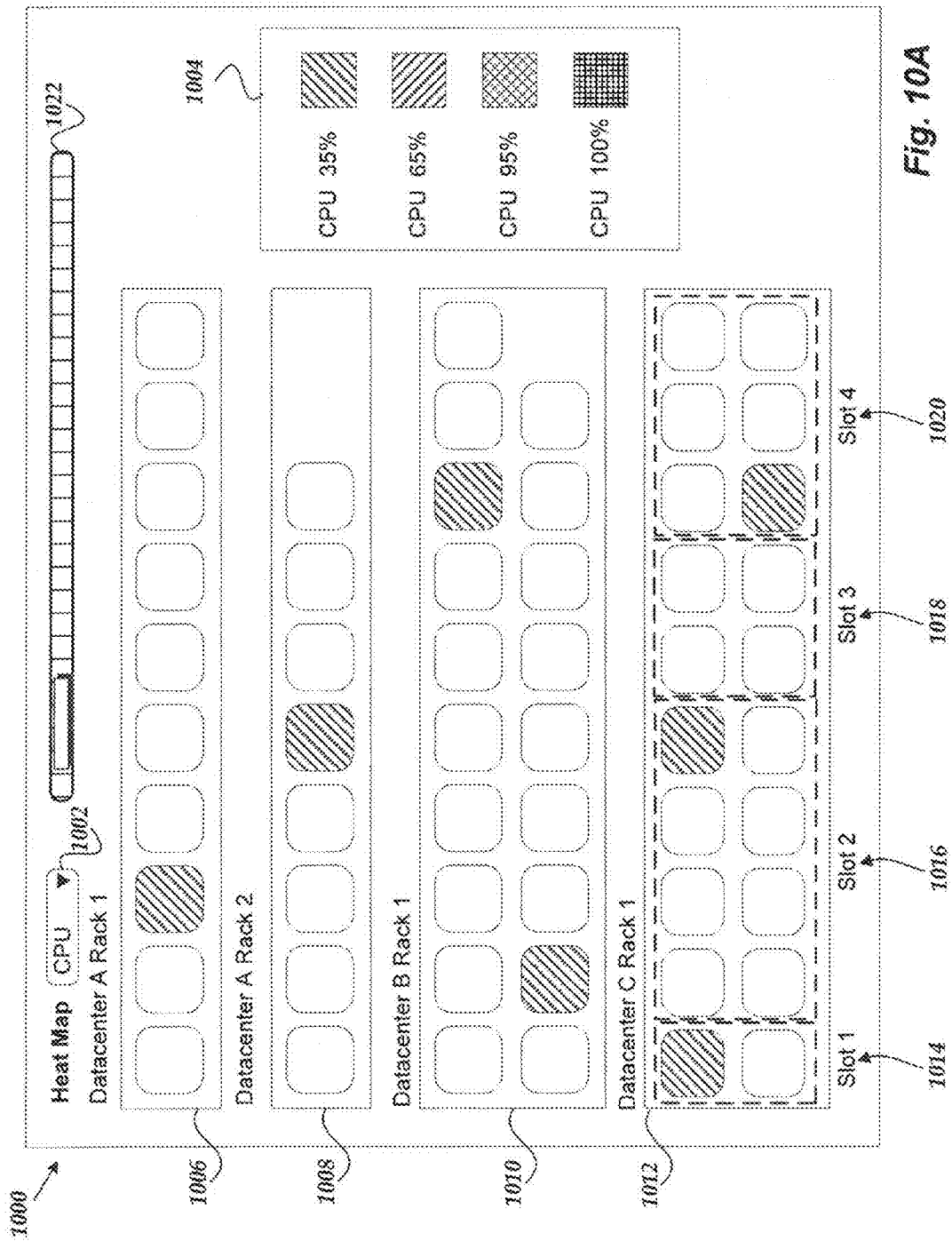
FIGS. 10A-10D illustrates a heat map user-interface that is configured to visualize the CPU utilization of cluster nodes in accordance with at least one of the various embodiments.
Figure 10B:
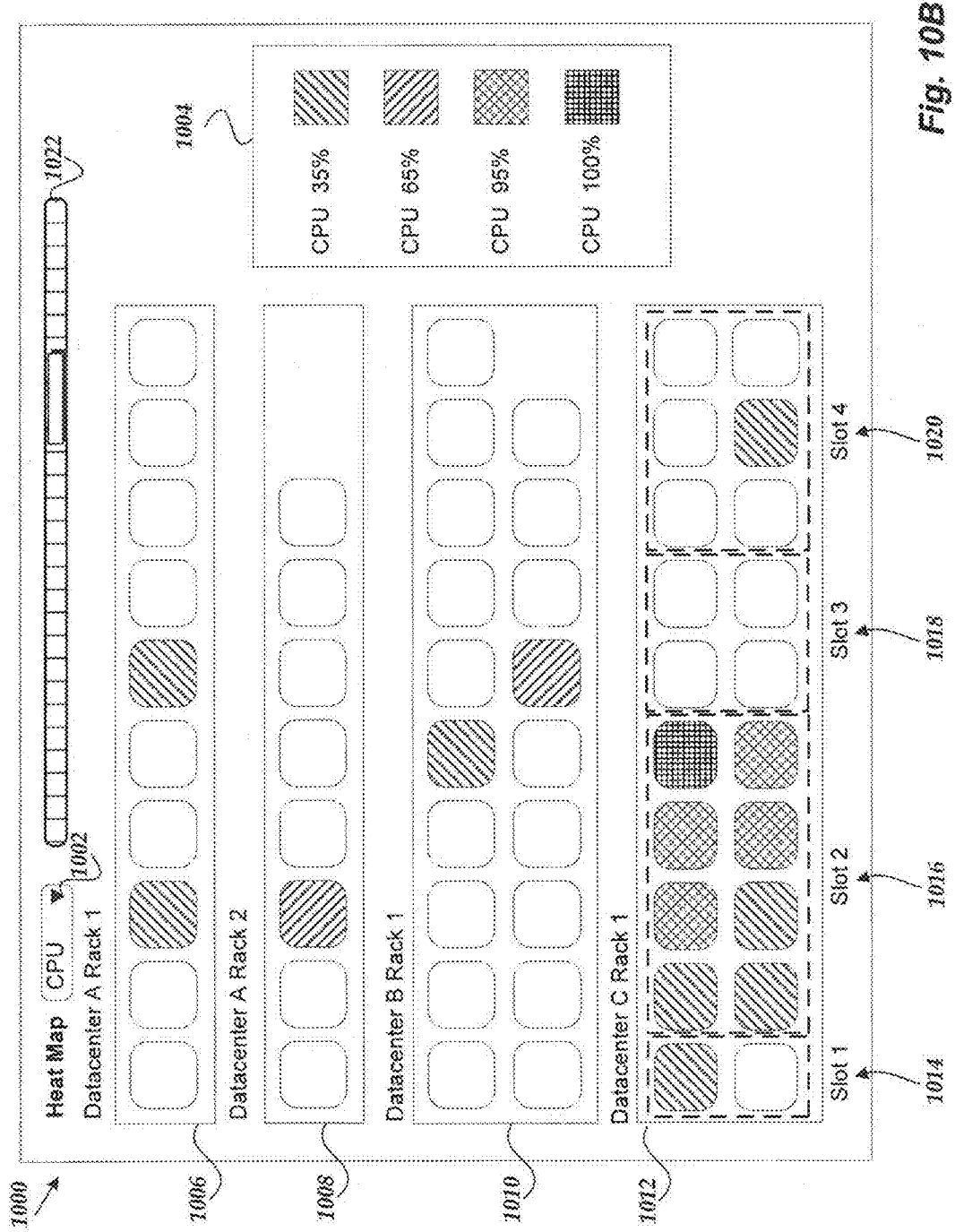
Figure 10C:
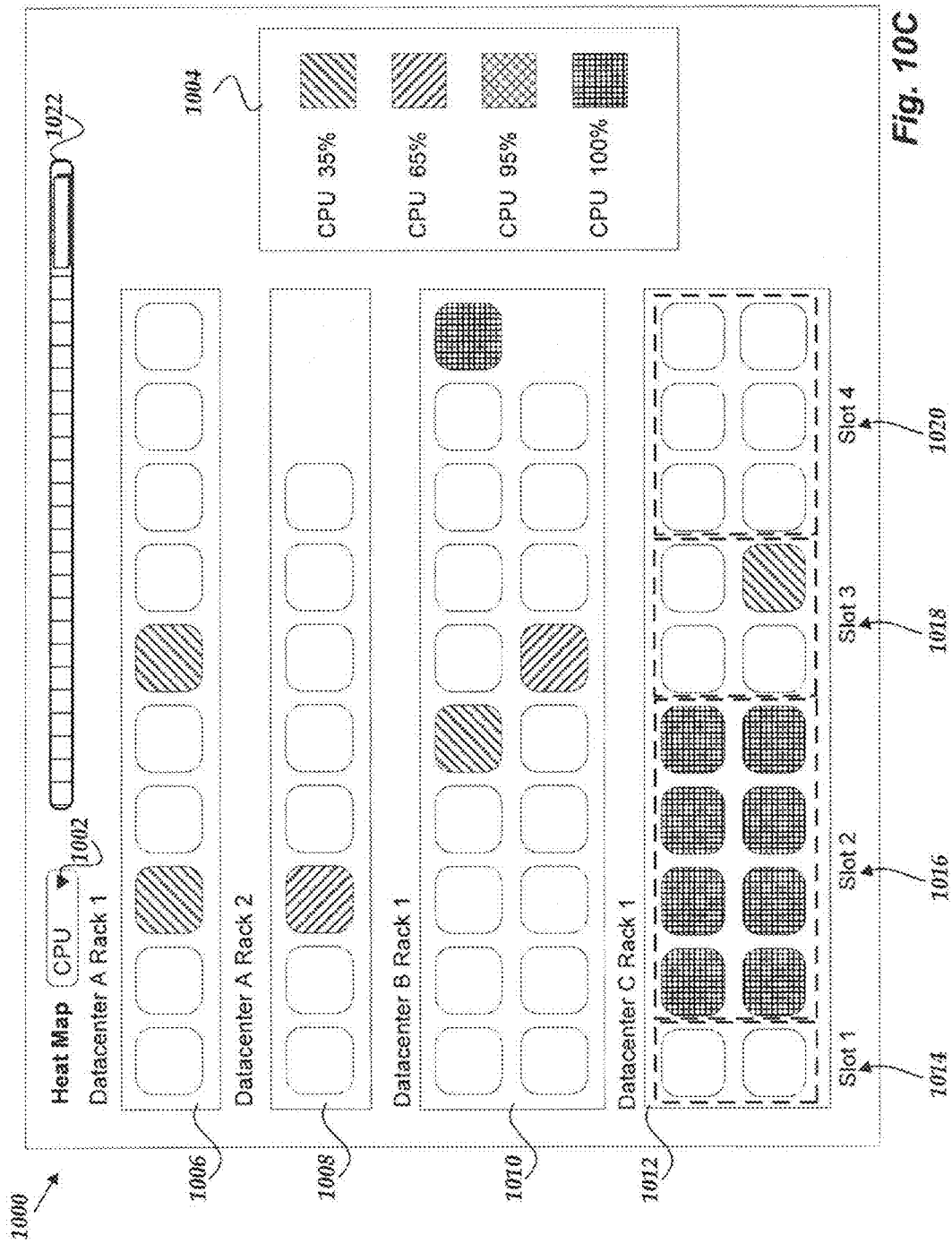

In at least one of the various embodiments, the visualization application may generate a heat map that may be employed to visualize various aspects of the performance of one or more computing clusters and their associated cluster nodes. FIGS. 10A-10C may represent an illustrative example of a sequence of heat maps. The sequence of figures demonstrates how the visualization application may generate heat maps that may be used to visualize a progression of events and/or conditions occurring in a computing cluster. In at least one of the various embodiments, progressive visualizations using sequential heat maps may enable users to identify critical events, improve troubleshooting, or identify of the root causes of errors occurring in the cluster.

FIG. 10A illustrates heat map user-interface 1000 that is configured to visualize the CPU utilization of cluster nodes in accordance with at least one of the various embodiments. In at least one of the various embodiments, heat map control 1002 indicates that the user-interface is configured to generate a heat map based on the CPU utilization of the cluster nodes. In at least one of the various embodiments, additional factors may be chosen using heat map control 1002. See, FIG. 10D.

In at least one of the various embodiments, a heat map may represent values of a monitored property using various visual indicators (e.g., colors, patterns, or the like) that correspond to the value of the metric being analyzed. In FIGS. 10A-10C the different patterns of cross-hatching correspond to utilization levels of the cluster node CPUs. Legend 1004 is illustrative of the CPU utilizations levels and patterns that may be present in one of the various embodiments. In practice, a user may set the range of each level and the number of levels for each measured metric. In at least one of the various embodiments, linear or non-linear scales may be used for defining metric value ranges, including logarithmic scales. Also, in at least one of the various embodiments, users may configure the colors and/or patterns employed by the vitalization application. In at least one of the various embodiments, legend 1004 indicates that the illustrative heat map may have been configured to generate a visualization based on four levels of CPU utilization, 35%, 65%, 95%, and 100%.

In at least one of the various embodiments, slider control 1022 may be employed by a user to analyze the progression of the heat map data. It may enable users to interactively step through a replay of the heat map in the time dimension.

In at least one of the various embodiments, at the beginning of the sequence, as shown in FIG. 10A, the heat map shows for cluster node set 1006, one cluster node reports CPU utilization above 35%; cluster node set 1008 shows one cluster node reporting CPU utilization above 35%; cluster node set 1010 shows two cluster nodes reporting above 35% CPU utilization; and cluster node set 1012 shows three cluster nodes reporting 35% CPU utilization. Further in cluster node set 1016, slots 1014, 1016, and 1020 each show one cluster node reporting 35% CPU utilization and slot 1018 shows no cluster nodes reporting 35% CPU utilization. In this illustrative example, at this stage of the heat map progression, the CPU utilization rate may appear to be balanced and otherwise healthy.

In FIG. 10B the heat map has progressed further in time, in this view, cluster node set 1006 shows that two cluster nodes are reporting 35% CPU utilization; cluster node set 1008 shows one cluster node reporting 65% CPU utilization; cluster node set 1010 shows one cluster node reporting 35% CPU utilization and one cluster node reporting 65% CPU utilization; and cluster node set 1012 shows five cluster nodes reporting 35% CPU utilization, four cluster nodes reporting 95% CPU utilization, and one cluster node reporting 100% CPU utilization.

Furthermore, slot 1016 is showing an increased CPU utilization in each cluster node in the slot, with five of eight reporting significantly higher CPU utilization than other cluster nodes in the computing cluster.

In FIG. 10C the heat map has again progressed further in time, in this view, cluster node set 1006 shows two cluster nodes reporting 35% CPU utilization; cluster node set 1008 shows one cluster node reporting 65% CPU utilization; cluster node set 1010 shows one cluster node reporting 35% CPU utilization, one cluster node reporting 65% utilization, and one cluster node reporting 100% CPU utilization; and cluster node set 1012 shows one cluster node reporting 35% CPU utilization, and eight cluster nodes reporting 100% CPU utilization.

In this example, observing the progression of the heat map over time may make it clear to a user that a problem started one cluster node in slot 1016 and it grew progressively worse until it affected all the cluster nodes in the slot. E.g., an increased CPU utilization on one cluster node spread to all eight cluster nodes in the slot. In at least one of the various embodiments, this information may enable a user to target troubleshooting and recovery efforts at slot 1016.

Figure 10D:
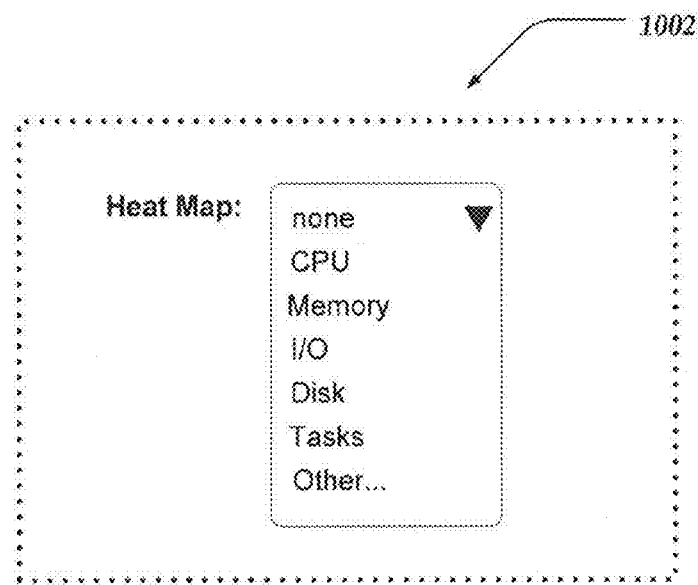

In at least one of the various embodiments, a user may change the heat map visualization to represent other factors that may be identified by the user and/or calculated from the indexed machine data received from the monitored computing cluster. FIG. 10D shows an expanded view of heat map control 1002. This expanded view illustrates one of the various embodiments for selecting a factor to visualize by using a heat map. In at least one of the various embodiments, a user may use the pull-down style control to quickly switch between different factors such as, CPU utilization, Memory utilization, input/output (I/O) rates, disk access, tasks (e.g., number of jobs, processes, threads, virtual machine instances, or the like), or the like. In at least one of the various embodiments, an entry for "other" may enable a user to generate one or more custom analysis lenses based at least in part on user-definable factors that may be generated by a query string, script, custom formula, plug-in module, or the like. In at least one of the various embodiments, one or more user-definable factors may be decoupled from one or more of the predetermined factors and may include, but are not limited to: locality, such as rack awareness for a blade server; time; physical distance (network hops); number of users; application types; data types; network protocols; network connections; mouse over detection; software components. A customized analysis lens may operate on the received machine data in real time or received machine data that is replayed over a selected time window. For example, a user may identify excessive CPU utilization with one analysis lens that is based on predetermined factors. And then employ one or more customized analysis lenses that use one or more user-definable (other) factors to determine the root cause of the excessive CPU utilization.

In at least one of the various embodiments, heat maps may be generated in real-time based on the indexing of the machine data as it is received from the computing cluster. In at least one of the various embodiments, real-time heat maps may be updated by the visualization application as machine data is received and indexed.

Also, in at least one of the various embodiments, heat maps may be generated based on data that was previously received and indexed. In at least one of the various embodiments, this may enable users to review a heat map progression that led up to an error or other condition of interest. Reviewing heat map progressions generated from stored machine data may enable users to view the progression of metric values and/or affected cluster nodes that led up to an error condition.

In at least one of the various embodiments, the visualization application may enable a replaying of the machine data to generate visualizations. In at least one of the various embodiments, the user may replay the machine data to generate additional visualizations and/or analyze events that may have occurred in the past for a selected time window or the entire period of time that the machine data was received. In at least one of the various embodiments, the index stores may retain the complete record of the machine data. Thus, in at least one of the various embodiments, replays may be based on the entire store or a selected portion of the store of received machine data enabling visualizations that accurately reflect the information reported by the cluster nodes.

In at least one of the various embodiments, the user may determine one or more time windows from which to generate heat map progressions. If a time window is determined, the visualization application may generate heat maps that correspond to the machine data received from the computing cluster during the period of the time window. In at least one of the various embodiments, users may select time windows by entering a start and stop time, a start time plus a duration (e.g., 1/1/12 10:00+120 minutes), a stop time less a duration (e.g., now—90 minutes), a point in time with before and after durations (e.g., 1/1/12 10:00±100 minutes), or the like. The boundaries of the time window may be entered using well-known user interface techniques such as dialog boxes, user-interface forms, menus, sliders, or the like.

In at least one of the various embodiments, in addition to determining a time window, a user may determine the time interval of the generated heat map progression. For example, if a user determines a time interval of 10 minutes, the visualization application may generate a heat map sequence with one heat map per 10 minute time interval.

In at least one of the various embodiments, the heat map metric(s), the time window, and the time interval in combination may determine an analysis lens that may be employed by the user to analyze machine data received from the computing cluster. By modifying the components of the analysis lens, the user may focus on the machine data using varying viewpoints and perspectives. For example, if at first a user discovers evidence of an error using a lens that includes CPU utilization, a 96 hour time window, and a 4 hour time interval. The user may "refocus" the lens by selecting different metrics, time windows, time intervals, or the like.

In at least one of the various embodiments, if an analysis lens is selected, the visualization application may generate the corresponding visualization. The visualization may be generated from the indexed machine data received from the computing cluster. In at least one of the various embodiments, the machine data and its associated indexes may be used by the visualization application. Thus, in at least one of the various embodiments, if an analysis lens is enabled by a user, the visualization application may have access to all of the machine data that was received from the computing cluster. Accordingly, the user may use an analysis lens that includes metrics and/or calculations that may not have been anticipated at the time the machine data was collected.

In at least one of the various embodiments, slider 1022 may be employed to interactively view and/or generate heat map progressions. As a user "slides" slider 1022, the heat map visualization may advance or retreat in time. In at least one of the various embodiments, a user may employ slider 1022 to review how a heat map progresses over a selected time window for one metric and then change to another metric (e.g., using heat map control 1002) to see the same time window for the other metric. Slider 1022 also enables time "dilation" where the user can select to slow down and/or step the rate at which the heat map progresses. Also, slider 1022 enables time "acceleration" where the user can select to fast forward or jump the rate at which the heat map progresses. This may enable a user to quickly identify potential problems that may be causing the first discovered error that are occurring over a very short period of time or over a very long period of time.

For example, a user may employ slider 1022 to view a CPU utilization heat map that may lead to the identification of a trouble spot. See, FIGS. 10A-10C. Next, the user may change the analysis lens by using heat map control 1002 to select memory as the primary heat map metric. Now, the heat map will show memory utilization for the cluster node during the same time window where the CPU utilization increases were observed. If the visualization application is employed to generate progressive memory utilization heat maps over the same time window as the previous CPU utilization heat maps, a user may observe if the memory utilization may be a precursor to the earlier detected CPU utilization hot spots or vice versa.

In at least one of the various embodiments, by changing analysis lenses the users may be enabled to observe and compare relationships between various predetermined and user-defined factors. These comparisons may be based on the received machine data that is being indexed. Additionally, the comparisons may also be made with one or more registered event pattern alerts based on machine data that was previously received and which may or may not be part of the received machine data that is being indexed. Comparisons of the registered event pattern alerts may be employed to identify a previously determined problem and may also be used to suggest a solution to the user.

Figure 11:
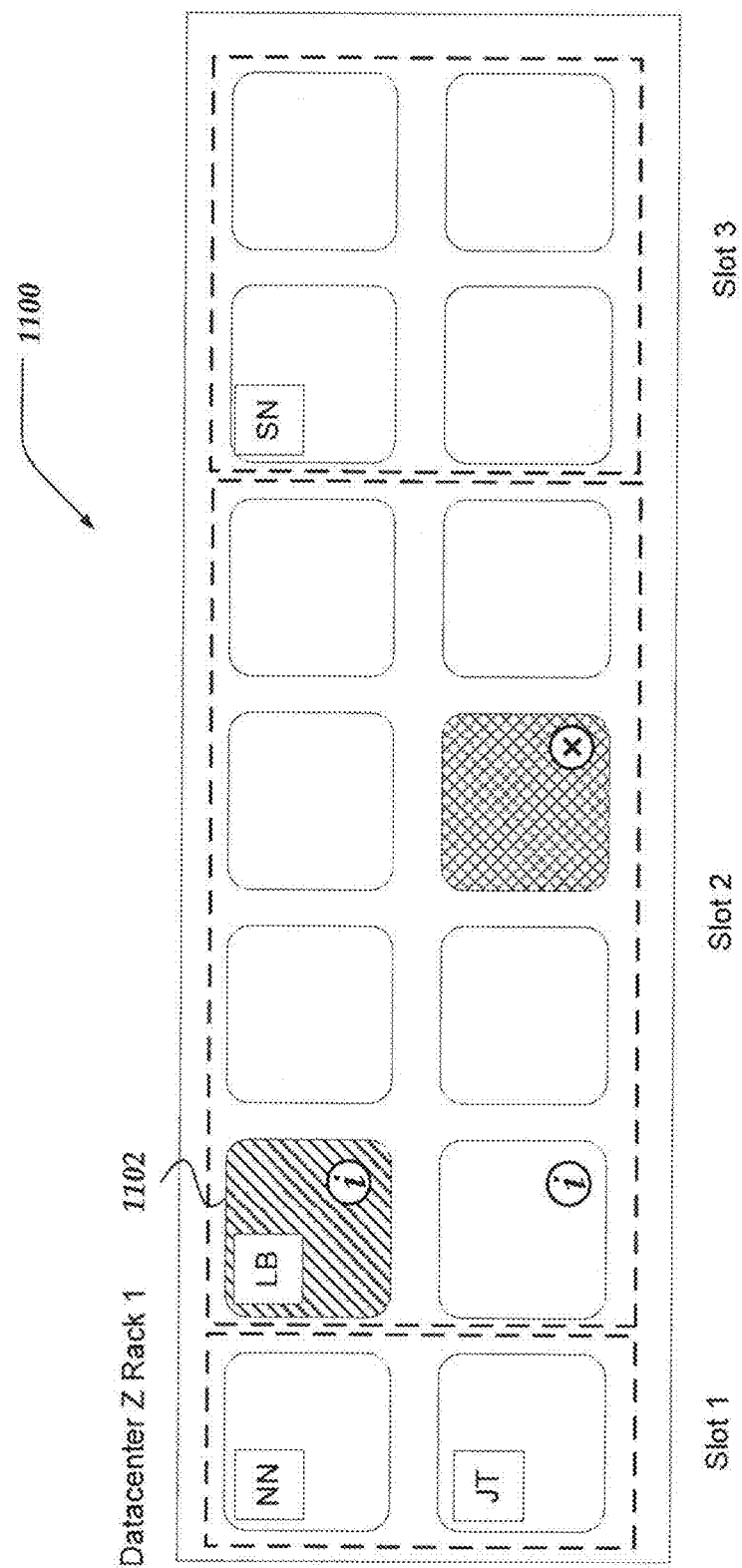
FIG. 11 shows an illustrative example of a portion of a user-interface displaying layered properties of a cluster node set in accordance with at least one of the various embodiments.

FIG. 11 shows an illustrative example of a portion of a user-interface displaying layered properties of cluster node set 1100 in accordance with at least one of the various embodiments. In at least one of the various embodiments, the visualization application may generate visualizations that include multiple properties that are overlaid (layered) onto the same cluster node view.

In at least one of the various embodiments, events, such as those shown in FIG. 8 may be combined with heat maps to produce a single visualization. Additionally, icons or symbols that represent other properties of cluster nodes, cluster node seta, or computing clusters, may be layered onto a single view. In at least one of the various embodiments, well-known user-interfaces, such as check boxes, radio buttons, select lists, or the like, may be employed by a user to determine which properties may be layered into a generated visualization. For example, in at least one of the various embodiments, cluster node 1102 shows heat map data, event level, and cluster node type (LB may indicate a load balancer).

Generalized Operation

FIGS. 12-15 represent the generalized operation of visualization of data from computing clusters in accordance with at least one of the various embodiments.

Figure 12:
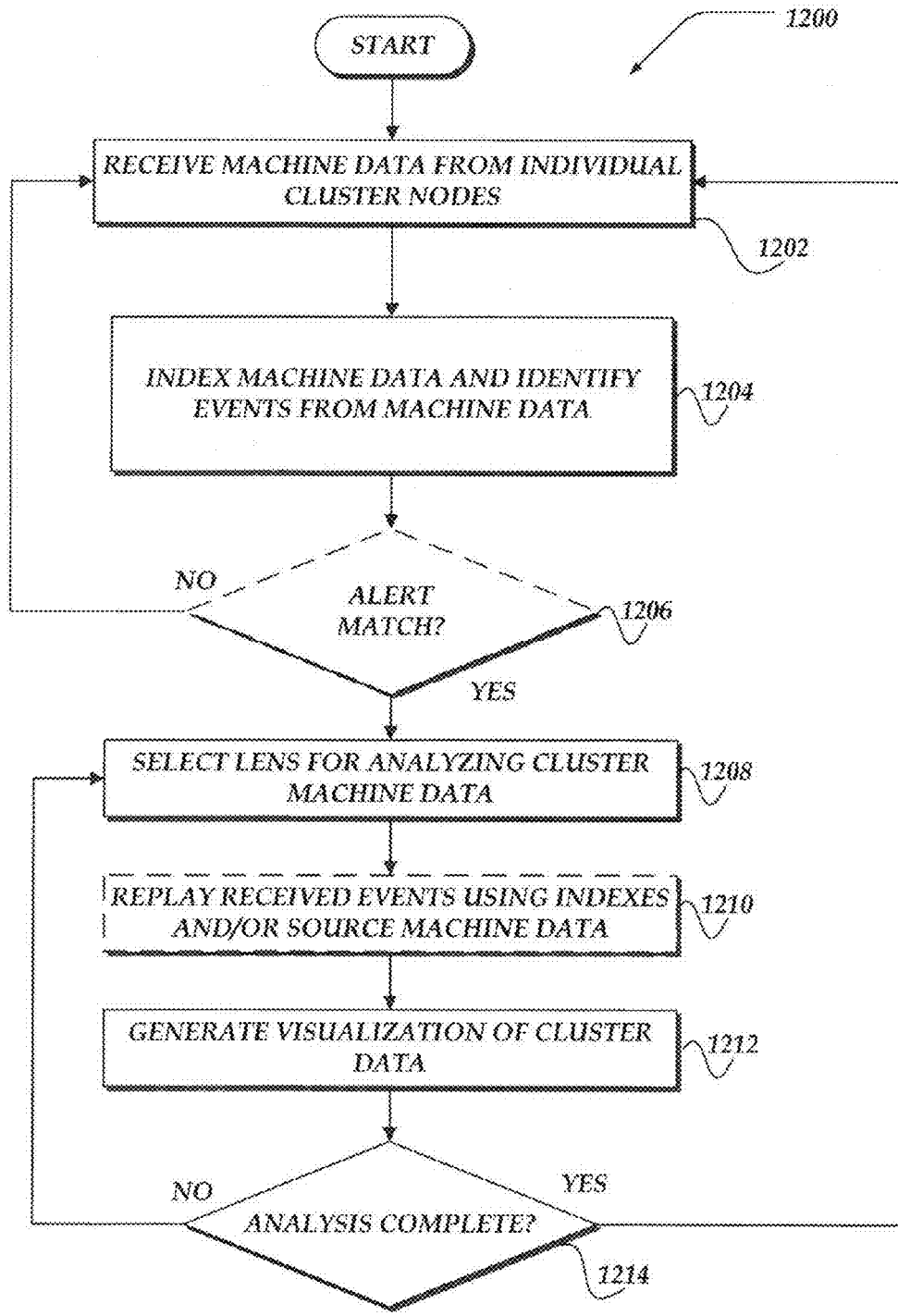
FIG. 12 is an overview flowchart for a process to visualize data from computing clusters in accordance with at least one of the various embodiments.

FIG. 12 is an overview flowchart for process 1200 to visualize data from computing clusters in accordance with at least one of the various embodiments. After a start block, at block 1202, in at least one of the various embodiments, machine data may be received from one or more individual cluster nodes that may be in a computing cluster.

At block 1204, in at least one of the various embodiments, the received machine data may be processed to identify events and indexed. In at least one of the various embodiments, the machine data and the corresponding indexes may be stored and made available to the visualization application. In at least one of the various embodiments, the indexing application may employ a configuration file to identify events included in the machine data.

At decision block 1206, in at least one of the various embodiments, optionally, the indexing application may be configured to generate alerts that correspond to particular events and/or event patterns. If an alert is matched, interested users may be notified and control may move to block 1208. Otherwise, in at least one of the various embodiments, control may loop back to block 1202.

In at least one of the various embodiments, users may begin an analysis of received computing cluster machine data in the absence of an alert match notification. In at least one of the various embodiments, users may simply decide that they would like to employ the visualization application to conduct analysis machine data received from a computing cluster.

At block 1208, in at least one of the various embodiments, an analysis lens for analyzing the machine data received from the computing cluster may be determined. In at least one of the various embodiments, a user may determine a particular analysis lens based on type of analysis being performed. Also, in at least one of the various embodiments, the visualization application may determine an initial analysis lens based on default values and/or configurations.

In at least one of the various embodiments, the visualization application may determine an initial analysis lens based on whether an event pattern matches one or more previously identified and/or configured event patterns. If an event pattern may be recognized as having been previously analyzed, the same analysis lens that was used before may be initially selected.

At block 1210, in at least one of the various embodiments, optionally, the visualization application may be employed to replay the events surrounding an event pattern of interest. In at least one of the various embodiments, the visualization application may employ the machine data and/or corresponding indexes to corresponding to a replay period to generate visualizations of the machine data received from the computing cluster.

At block 1212, in at least one of the various embodiments, the visualization application may generate one or more visualizations of cluster data. In at least one of the various embodiments, visualizations may include, heat maps, event overlays, or the like.

At decision block 1214, in at least one of the various embodiments, if the analysis may be complete, control may loop back to block 1202. Otherwise, in at least one of the various embodiments, control may loop back to block 1208. In at least one of the various embodiments, a user may continue selecting and/or modifying the analysis lens, replaying events, and generating visualizations until their analysis may be completed.

In at least one of the various embodiments, while the user is analyzing the computing cluster data the indexing applications may continue to receive machine data.

Figure 13:
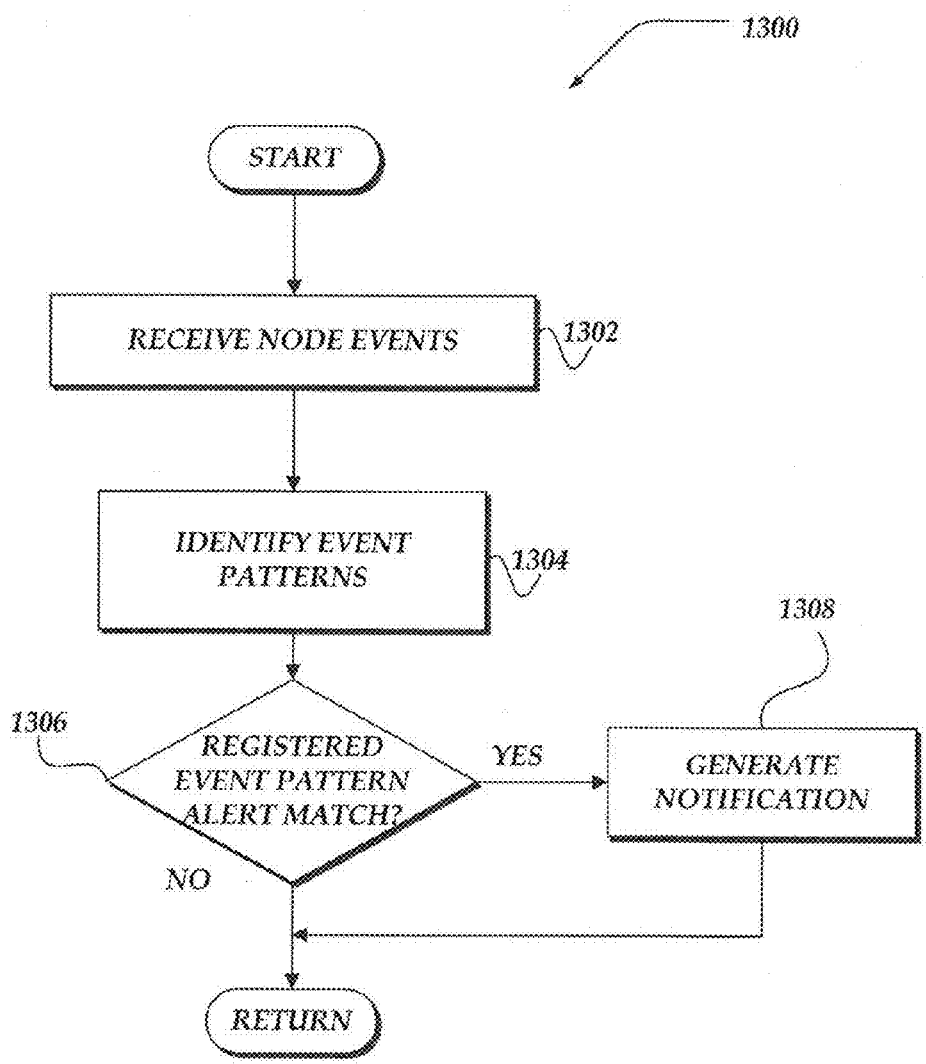
FIG. 13 shows a flowchart for a process to identify event patterns in accordance with at least one of the various embodiments.

FIG. 13 shows a flowchart for process 1300 to identify event patterns included in machine data in accordance with at least one of the various embodiments. After a start block, at block 1302, in at least one of the various embodiments, events that may be included in the machine data received from the computing cluster may be received. In at least one of the various embodiments, the indexing applications may generate/identify events that may be included in the machine data. In at least one of the various embodiments, the visualization application may receive cluster node events from the various index stores. In at least one of the various embodiments, event streams may correspond to a query, or search executed using a time series engine.

At block 1304, in at least one of the various embodiments, one or more event pattern matching processes may be employed to identify and/or detect one or more relevant event patterns. (See, FIG. 15.)

At decision block 1306, in at least one of the various embodiments, if an identified event pattern is found to match a previously registered event pattern alert, control may advance to block 1308. Otherwise, in at least one of the various embodiments, control may be returned to the calling process.

At block 1308, in at least one of the various embodiments, one or more notifications may be generated that correspond to one or more of the registered event patterns alerts. If the event pattern notifications are sent, control may be returned to a calling process.

Figure 14:
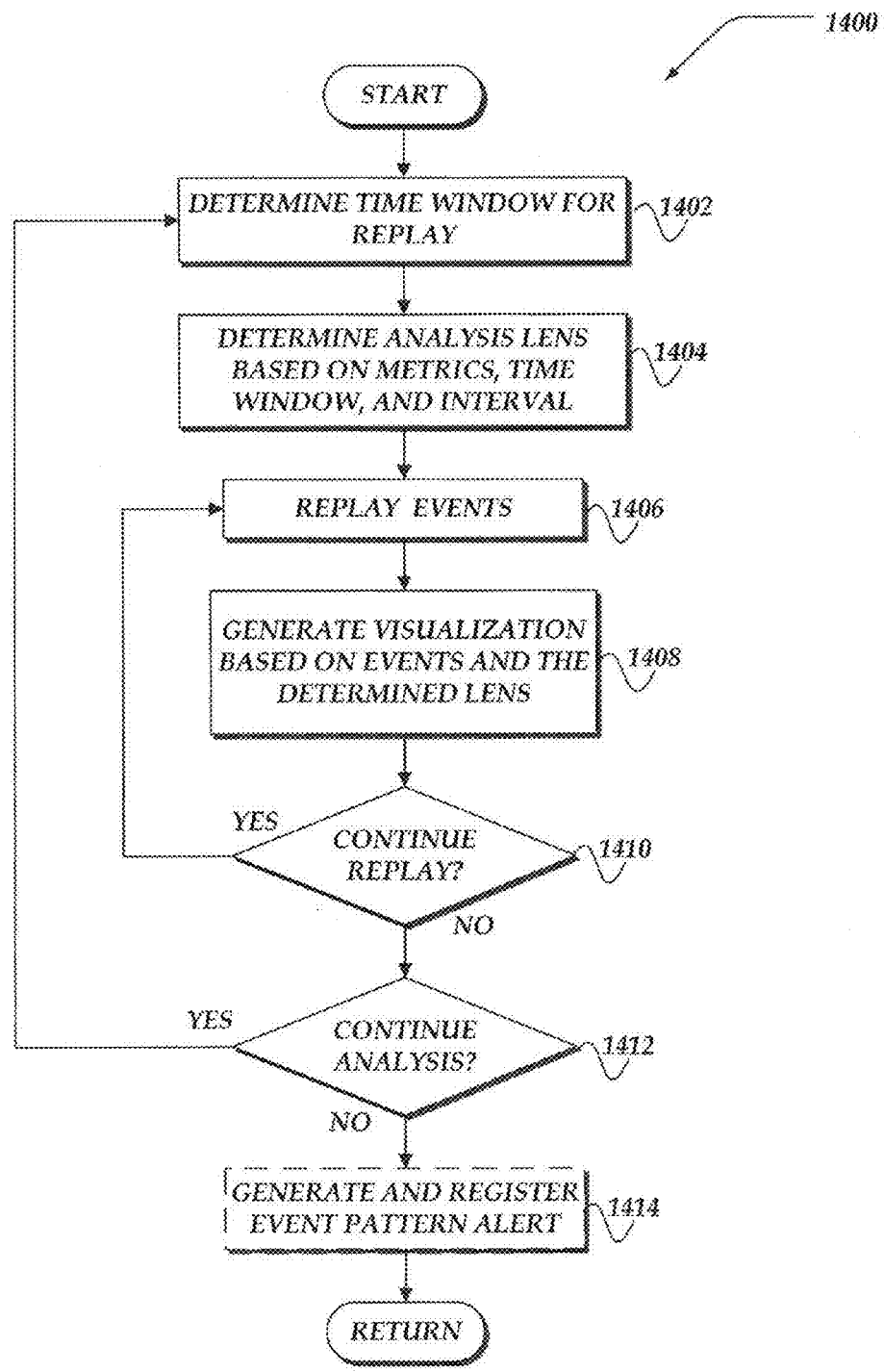
FIG. 14 shows a flowchart for a process to replay events in accordance with at least one of the various embodiments.

FIG. 14 shows a flowchart for process 1400 to replay events in accordance with at least one of the various embodiments. After a start block, at block 1402, in at least one of the various embodiments, the time window for replaying events may be determined. In at least one of the various embodiments, the time window may be based on inputs provided by users through one or more well-known user-interfaces techniques.

At block 1404, in at least one of the various embodiments, an analysis lens may be determined based on one or more predetermined and/or user-defined factors.

At block 1406, in at least one of the various embodiments, the visualization application may begin replaying the events that may have been received from the computing cluster. In at least one of the various embodiments, the visualization application may retrieve the events from the index stores by using searches, or query strings that correspond to the metrics being visualized. In at least one of the various embodiments, the visualization application may employ a time series search engine to retrieve the data for use in generating the visualization.

At block 1408, in at least one of the various embodiments, one or more visualizations based on the events and the analysis lens may be generated. In at least one of the various embodiments, visualizations may include heat maps, event overlays, graphs, or the like.

At decision block 1410, in at least one of the various embodiments, if the replay is continuing, control may loop back block 1406. Otherwise, in at least one of the various embodiments, control may move to decision block 1412.

At decision block 1412, in at least one of the various embodiments, if analysis of the machine data received from the computing cluster is continuing, control may loop back to block 1402. Otherwise, in at least one of the various embodiments, control move to block 1414.

At block 1414, in at least one of the various embodiments, optionally, an event pattern alert may be generated based on analysis of one or more observed event patterns. In at least one of the various embodiments, a user may register the event pattern alert with the visualization application and associate one or more tags and/or descriptions with the registered event pattern alert. In at least one of the various embodiments, the event pattern alert may enable users to register to receive notifications if the same or similar event pattern is detected/identified at another time. Next, in at least one of the various embodiments, control may be returned to a calling process.

Figure 15:
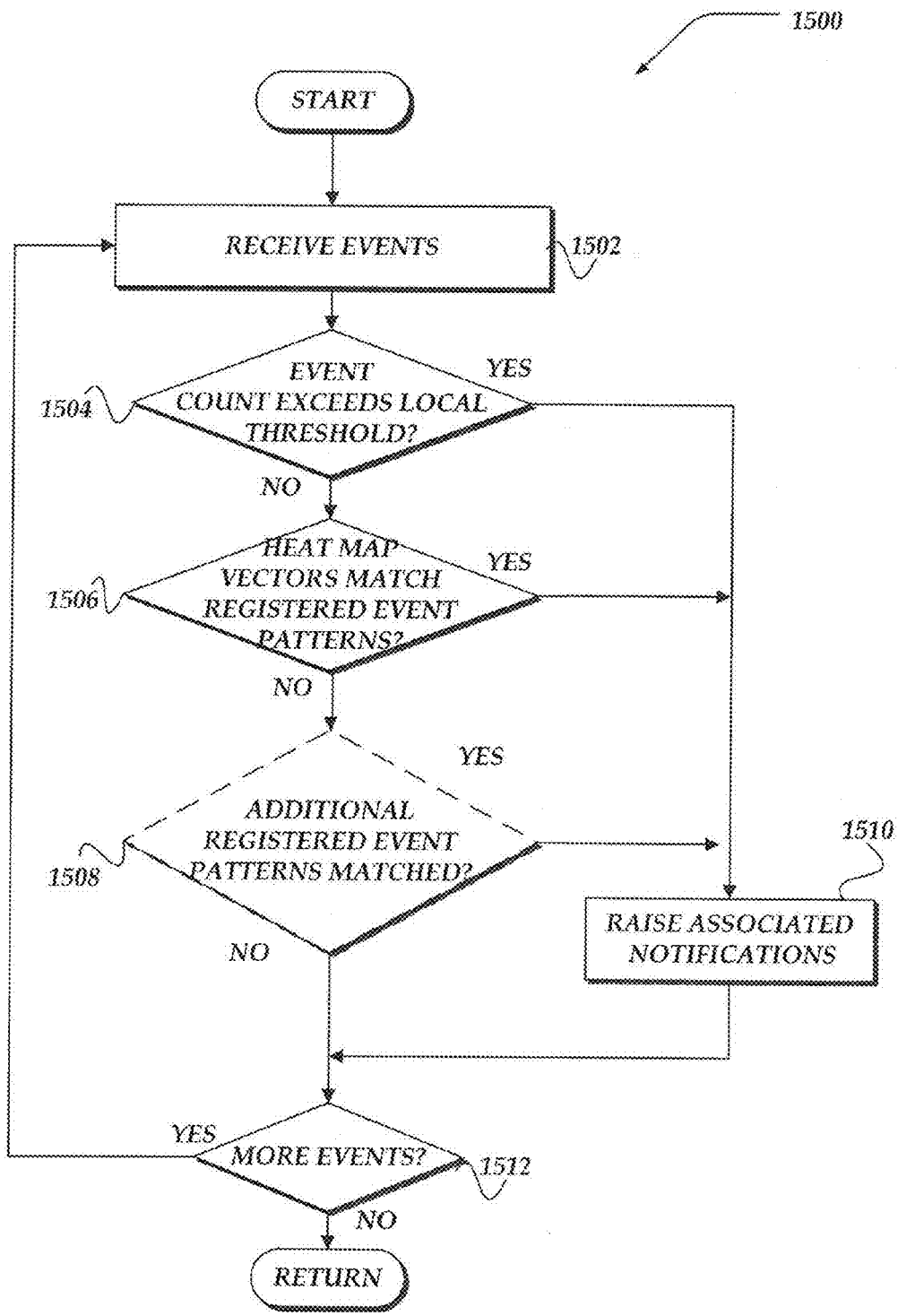
FIG. 15 shows a flowchart for a process to detect event patterns of interest in accordance with at least one of the various embodiments.

FIG. 15 shows a flowchart for process 1500 to detect event patterns in accordance with at least one of the various embodiments. After a start bock, at block 1502, in at least one of the various embodiments, events that may be included in the machine data received from the computing cluster may be received.

At block 1504, in at least one of the various embodiments, if the event count exceeds a local threshold, control may move to block 1508. Otherwise, in at least one of the various embodiments, control may move to decision block 1506.

In at least one of the various embodiments, event patterns may be defined in a variety of ways. For example, in at least one of the various embodiments, an event pattern may be defined based on the number of events (or event types) reported by cluster nodes exceeding a threshold. In some cases, the threshold may be localized to cluster node sets, cluster nodes, racks, data centers, or slots. For example, an event pattern may be defined as "receiving 100 critical events from the same rack within 10 minutes." If the event pattern is matched the appropriate notifications may be raised.

At decision block 1506, in at least one of the various embodiments, if the heat map vectors match a known pattern, control may move to block 1508. Otherwise, in at least one of the various embodiments, control may move to decision block 1512.

In at least one of the various embodiments, a heat map may be interpreted as expanding or contracting. In at least one of the various embodiments, received events may be analyzed to determine if they correspond to a previously generated heat map.

In at least one of the various embodiments, well-known techniques may be employed to identify if incoming events appear to fit the same or similar event patterns such as heat maps that may be associated with known expansion or contraction problems. If a heat map pattern associated with a failure condition is identified early enough, a notification may be raised enabling intervention and/or correction before the problem progresses to terminal failure.

At block 1508, in at least one of the various embodiments, optionally, additional event pattern matching/identifying processes/rules may be employed. In at least one of the various embodiments, visualization application or the indexing application may supply a suite of matching rules that users may activate and/or associate with event patterns of interest. In at least one of the various embodiments, customized pattern matching may be employed that may include the use of, scripts, query strings, regular expressions, or the like. Additionally, a heuristic analysis based on one or more registered event patterns may be employed to predict in advance the occurrence of the same or similar event patterns, such as an event pattern for terminal failure.

At block 1510, in at least one of the various embodiments, other notifications that may be associated with one or more identified event patterns may be identified and raised. In at least one of the various embodiments, these notifications may be generated for users based on one or more factors such as user preferences or default settings of the visualization application. In at least one of the various embodiments, notifications may be raised using a variety of well-known notification techniques, such as, email, text messages, audio and/or visual user-interface alarms, or the like.

At decision block 1512, in at least one of the various embodiments, if there may be more events being received, control may loop back to block 1502. Otherwise, in at least one of the various embodiments, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

It will be understood that for at least one of the various embodiments, various types of data may be received and processed as described and claimed herein. And, at least one of the various embodiments is not limited to processing machine data.

What is claimed as new and desired to be protected by Letters Patent of the United States is:

1. A computer-implemented method comprising:
   receiving machine data from a computing cluster, the computing cluster including a plurality of computational cluster nodes coordinating in operation;
   generating time stamped events from the received machine data, each time stamped event having a time stamp derived from time stamp data parsed from the received machine data;
   analyzing, for each computational cluster node of the plurality of computational cluster nodes, a metric characterizing an aspect of computational performance of the computational cluster node, wherein the metric is analyzed based on values included in a set of time stamped events;
   computing an event pattern using analyzed metrics;
   monitoring whether the event pattern is indicative of a previously determined or known problem for operation of the computing cluster using a heuristic analysis; and
   generating a notification when the event pattern is indicative of a previously determined or known problem for operation of the computing cluster.

2. The method of claim 1, wherein monitoring whether the event pattern is indicative of a previously determined or known problem comprises comparing the event pattern with a predefined alert pattern.

3. The method of claim 1, wherein the predefined alert pattern comprises a pattern identified by a user.

4. The method of claim 1, further comprising:
   indexing the received machine data;
   storing the indexed data; and
   retrieving select indexed data to determine the metric.

5. The method of claim 1, wherein the event pattern comprises a pattern in a heat map, wherein the heat map represents, for each computational cluster node of the plurality of computational cluster nodes, the metric of the node.

6. The method of claim 5, wherein determining that the event pattern is indicative of a previously determined or known problem comprises determining whether the heat map is expanding or contracting.

7. The method of claim 1, further comprising, generating a visualization of cluster data when the event pattern is indicative of a previously determined or known problem for operation of the computing cluster, wherein the visualization includes a representation of each computational cluster node of the plurality of computational cluster nodes and the metric for each node.

8. A network device comprising:
   a device, implemented at least partially in hardware, that receives machine data from a computing cluster, the computing cluster including a plurality of computational cluster nodes coordinating in operation;
   a device, implemented at least partially in hardware, that generates time stamped events from the received machine data, each time stamped event having a time stamp derived from time stamp data parsed from the received machine data;
   a device, implemented at least partially in hardware, that analyzes, for each computational cluster node of the plurality of computational cluster nodes, a metric characterizing an aspect of computational performance of the computational cluster node, wherein the metric is analyzed based on values included in a set of time stamped events;

a device, implemented at least partially in hardware, that computes an event pattern using analyzed metrics;

a device, implemented at least partially in hardware, that monitors whether the event pattern is indicative of a previously determined or known problem for operation of the computing cluster using a heuristic analysis; and a device, implemented at least partially in hardware, that generates a notification when the event pattern is indicative of the previously determined or known problem for operation of the computing cluster.

9. The network device of claim 8, wherein the device that monitors whether the event pattern is indicative of a previously determined or known problem further comprises a device, implemented at least partially in hardware, that compares the event pattern with a predefined alert pattern.

10. The network device of claim 8, wherein the predefined alert pattern comprises a pattern identified by a user.

11. The network device of claim 8, further comprising:
a device, implemented at least partially in hardware, that indexes the received machine data;
a device, implemented at least partially in hardware, that stores the indexed data; and
a device, implemented at least partially in hardware, that retrieves select indexed data to determine the metric.

12. The network device of claim 8, wherein the event pattern comprises a pattern in a heat map, wherein the heat map represents, for each computational cluster node of the plurality of computational cluster nodes, the metric of the node.

13. The network device of claim 12, wherein the device that determines that the event pattern is indicative of a previously determined or known problem further comprises a device, implemented at least partially in hardware, that determines whether the heat map is expanding or contracting.

14. The network device of claim 8, further comprising:
a device, implemented at least partially in hardware, that upon determining that the event pattern is indicative of the previously determined or known problem for operation of the computing cluster, generates a visualization of cluster data, wherein the visualization includes a representation of each computational cluster node of the plurality of computational cluster nodes and the metric for each node.

15. A non-transitive storage medium that includes a plurality of instructions, wherein execution of at least a portion of the instructions by a processor device enables a plurality of actions, the actions comprising:
receiving machine data from a computing cluster, the computing cluster including a plurality of computational cluster nodes coordinating in operation;
generating time stamped events from the received machine data, each time stamped event having a time stamp derived from time stamp data parsed from the received machine data;
analyzing, for each computational cluster node of the plurality of computational cluster nodes, a metric characterizing an aspect of computational performance of the computational cluster node, wherein the metric is analyzed based on values included in a set of time stamped events;
computing an event pattern using analyzed metrics;
monitoring whether the event pattern is indicative of a previously determined or known problem for operation of the computing cluster using a heuristic analysis; and
generating a notification when the event pattern is indicative of a previously determined or known problem for operation of the computing cluster.

16. The medium of claim 15, wherein monitoring whether the event pattern is indicative of a previously determined or known problem comprises comparing the event pattern with a predefined alert pattern.

17. The medium of claim 15, wherein the predefined alert pattern comprises a pattern identified by a user.

18. The medium of claim 15, wherein the actions further comprise:
indexing the received machine data;
storing the indexed data; and
retrieving select indexed data to determine the metric.

19. The medium of claim 15, wherein the event pattern comprises a pattern in a heat map, wherein the heat map represents, for each computational cluster node of the plurality of computational cluster nodes, the metric of the node.

20. The medium of claim 19, wherein determining that the event pattern is indicative of a previously determined or known problem comprises determining whether the heat map is expanding or contracting.

21. The medium of claim 15, wherein the actions further comprise, generating a visualization of cluster data when the event pattern is indicative of a previously determined or known problem for operation of the computing cluster, wherein the visualization includes a representation of each computational cluster node of the plurality of computational cluster nodes and the metric for each node.

22. A system comprising:
a plurality of nodes; and
a network device, including:
a memory device for storing instructions; and
a processor device that executes at least a portion of the stored instructions to enable a plurality of actions, the actions including:
receiving machine data from a computing cluster, the computing cluster including a plurality of computational cluster nodes coordinating in operation;
generating time stamped events from the received machine data, each time stamped event having a time stamp derived from time stamp data parsed from the received machine data;
analyzing, for each computational cluster node of the plurality of computational cluster nodes, a metric characterizing an aspect of computational performance of the computational cluster node, wherein the metric is analyzed based on values included in a set of time stamped events;
computing an event pattern using analyzed metrics;
monitoring whether the event pattern is indicative of a previously determined or known problem for operation of the computing cluster using a heuristic analysis; and
generating a notification when the event pattern is indicative of the previously determined or known problem for operation of the computing cluster.

23. The system of claim 22, wherein determining that the event pattern is indicative of a previously determined or known problem comprises comparing the event pattern with a predefined alert pattern.

24. The system of claim 22, wherein the event pattern comprises a pattern in a heat map, wherein the heat map represents, for each computational cluster node of the plurality of computational cluster nodes, the metric of the node.

* * * * *